(12) United States Patent
Subramanian et al.

(10) Patent No.: US 10,079,730 B2
(45) Date of Patent: Sep. 18, 2018

(54) NETWORK BASED RESOURCE CONFIGURATION DISCOVERY SERVICE

(71) Applicant: Amazon Technologies, Inc., Seattle, WA (US)

(72) Inventors: Hariharan Subramanian, Santa Clara, CA (US); David Samuel Zipkin, Belmont, CA (US); Derek Avery Lyon, San Francisco, CA (US); Cristian Gabriel Gafton, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 184 days.

(21) Appl. No.: 14/871,701

(22) Filed: Sep. 30, 2015

(65) Prior Publication Data
US 2017/0093640 A1 Mar. 30, 2017

(51) Int. Cl.
G06F 15/173 (2006.01)
H04L 12/24 (2006.01)
H04L 29/08 (2006.01)

(52) U.S. Cl.
CPC .......... *H04L 41/12* (2013.01); *H04L 41/0806* (2013.01); *H04L 41/5058* (2013.01);
(Continued)

(58) Field of Classification Search
CPC . H04L 41/12; H04L 41/0806; H04L 41/5058; H04L 41/0816; H04L 41/22; H04L 67/16
(Continued)

(56) References Cited

U.S. PATENT DOCUMENTS 7,069,343 B2 * 6/2006 Goringe ................ H04L 41/046
709/220
7,219,124 B2 * 5/2007 Cerami ................ G06Q 10/087
370/351
(Continued)

FOREIGN PATENT DOCUMENTS

CN 102377786 3/2012
CN 103714050 4/2014
WO 2012102863 8/2012

OTHER PUBLICATIONS

International Search Report and Written Opinion for PCT/US2016/054936, dated Jan. 16, 2017, pp. 1-11, Amazon Technologies, Inc.
(Continued)

*Primary Examiner* — Thu Ha Nguyen
(74) *Attorney, Agent, or Firm* — Robert C. Kowert; Meyertons, Hood, Kivlin, Kowert & Goetzel, P.C.

(57) ABSTRACT

A network-based discovery system and service are disclosed that provide client discovery services to a number of clients over a network. The network-based discovery system includes a database that stores discovery information of client network-based resource configurations. The discovery information may be obtained from client resources by client-side discovery components that are placed on client resources, obtain the discovery information and that send the information to the discovery system. The discovery system analyzes the discovery information to determine the client network-based resource configurations and generates client network-based resource configuration representations for the respective clients. The client network-based resource configuration representation may include a description of, and dependencies among, a plurality of computer-based resources. The discovery service may operate across a client network that spans both of a client's enterprise data net-
(Continued)

works as well as resources that are operated on behalf of the same client by a service provider network.

20 Claims, 9 Drawing Sheets

(52) U.S. Cl.
CPC .......... *H04L 67/16* (2013.01); *H04L 41/0816* (2013.01); *H04L 41/22* (2013.01)

(58) Field of Classification Search
USPC ........................................ 709/220, 224, 223
See application file for complete search history.

(56) References Cited

U.S. PATENT DOCUMENTS

| | | | | |
|---|---|---|---|---|
| 7,299,277 | B1* | 11/2007 | Moran | H04L 41/5022 370/230 |
| 7,328,260 | B1* | 2/2008 | Muthiyan | H04L 41/0681 709/220 |
| 7,475,107 | B2* | 1/2009 | Maconi | G06F 9/44505 707/999.001 |
| 7,506,044 | B2* | 3/2009 | Doshi | H04L 41/00 707/999.003 |
| 7,552,238 | B2* | 6/2009 | Gulland | G06F 15/177 709/220 |
| 7,908,360 | B2* | 3/2011 | Gach | G05B 19/4185 709/224 |
| 7,930,372 | B2* | 4/2011 | Chatterjee | G06F 9/5055 709/220 |
| 8,001,219 | B2* | 8/2011 | Moorer | H04L 12/2807 700/19 |
| 8,037,202 | B2* | 10/2011 | Yeager | G06F 9/4862 709/203 |
| 8,185,619 | B1* | 5/2012 | Maiocco | H04L 12/6418 709/203 |
| 8,843,997 | B1* | 9/2014 | Hare | H04L 63/0281 709/200 |
| 9,037,722 | B2* | 5/2015 | Jensen-Horne | G06F 9/5061 709/220 |
| 2003/0033400 | A1* | 2/2003 | Pawar | G06F 11/302 709/223 |
| 2003/0212767 | A1* | 11/2003 | Yang-Huffman | H04L 69/329 709/220 |
| 2005/0108369 | A1* | 5/2005 | Sather | G06F 9/4411 709/220 |
| 2006/0146731 | A1 | 7/2006 | Lewis et al. | |
| 2007/0005746 | A1 | 1/2007 | Roe et al. | |
| 2007/0260713 | A1* | 11/2007 | Moorer | H04L 12/282 709/220 |
| 2012/0215816 | A1* | 8/2012 | Kidron | G06F 17/30867 707/803 |
| 2013/0054785 | A1* | 2/2013 | Adhikari | H04L 45/42 709/224 |
| 2013/0346619 | A1* | 12/2013 | Panuganty | H04L 41/12 709/226 |
| 2014/0095505 | A1* | 4/2014 | Blanchflower | G06F 17/30091 707/737 |
| 2014/0201340 | A1* | 7/2014 | Barnhill | H04L 12/2809 709/220 |
| 2014/0223099 | A1* | 8/2014 | Kidron | G06F 12/0806 711/118 |
| 2015/0234644 | A1 | 8/2015 | Ramanathan | |
| 2016/0048408 | A1* | 2/2016 | Madhu | G06F 11/1458 718/1 |
| 2016/0301579 | A1* | 10/2016 | Djukic | H04L 41/5009 |
| 2016/0330080 | A1* | 11/2016 | Bhatia | H04L 41/12 |
| 2017/0017934 | A1* | 1/2017 | Bou-Ghannam | G06Q 10/20 |

OTHER PUBLICATIONS

CloudEndure, "Simple Migration to the Cloud with No Downtime," 2014 copyright, downloaded from https://www.cloudendure.com/cloudmigrationproduct/ on Sep. 30, 2015, pp. 1-10.

Racemi Business Systems Agility, "Cloud Migration Software—Server Migration Software," Racemi 2015, downloaded from http://www.racemi.com/ on Sep. 30, 2015, pp. 1-2.

ScienceLogic, Inc. 2015, "The ScienceLogic Platform—Complete Hybrid IT Monitoring," downloaded from https://www.sciencelogic.com/product on Sep. 30, 2015, pp. 1-14.

RISC Networks (2015), "CloudScape", downloaded from http://www.riscnetworks.com/cloudscape/ on Sep. 30, 2015, pp. 1-13.

U.S. Appl. No. 15/189,976, filed Jun. 22, 2016, Hariharan Subramania, et al.

U.S. Appl. No. 15/189,979, filed Jun. 22, 2016, Hariharan Subramania, et al.

U.S. Appl. No. 15/189,983, filed Jun. 22, 2016, Hariharan Subramania, et al.

* cited by examiner

NETWORK BASED RESOURCE CONFIGURATION DISCOVERY SERVICE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization (e.g., an enterprise data center), and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine can be thought of as a software simulation acting as a distinct logical computing system that provides users with the illusion that they are the sole operators and administrators of a given hardware computing resource, while also providing application isolation among the various virtual machines.

Some enterprises may require tools for discovering the configuration of enterprise resources and/or cloud computing resources. However, current discovery tools do not support public APIs or open data formats, and do not provide services that operate across hybrid networks (e.g., networks that include both an enterprise data center as well as a service provider network).

Figure 1:
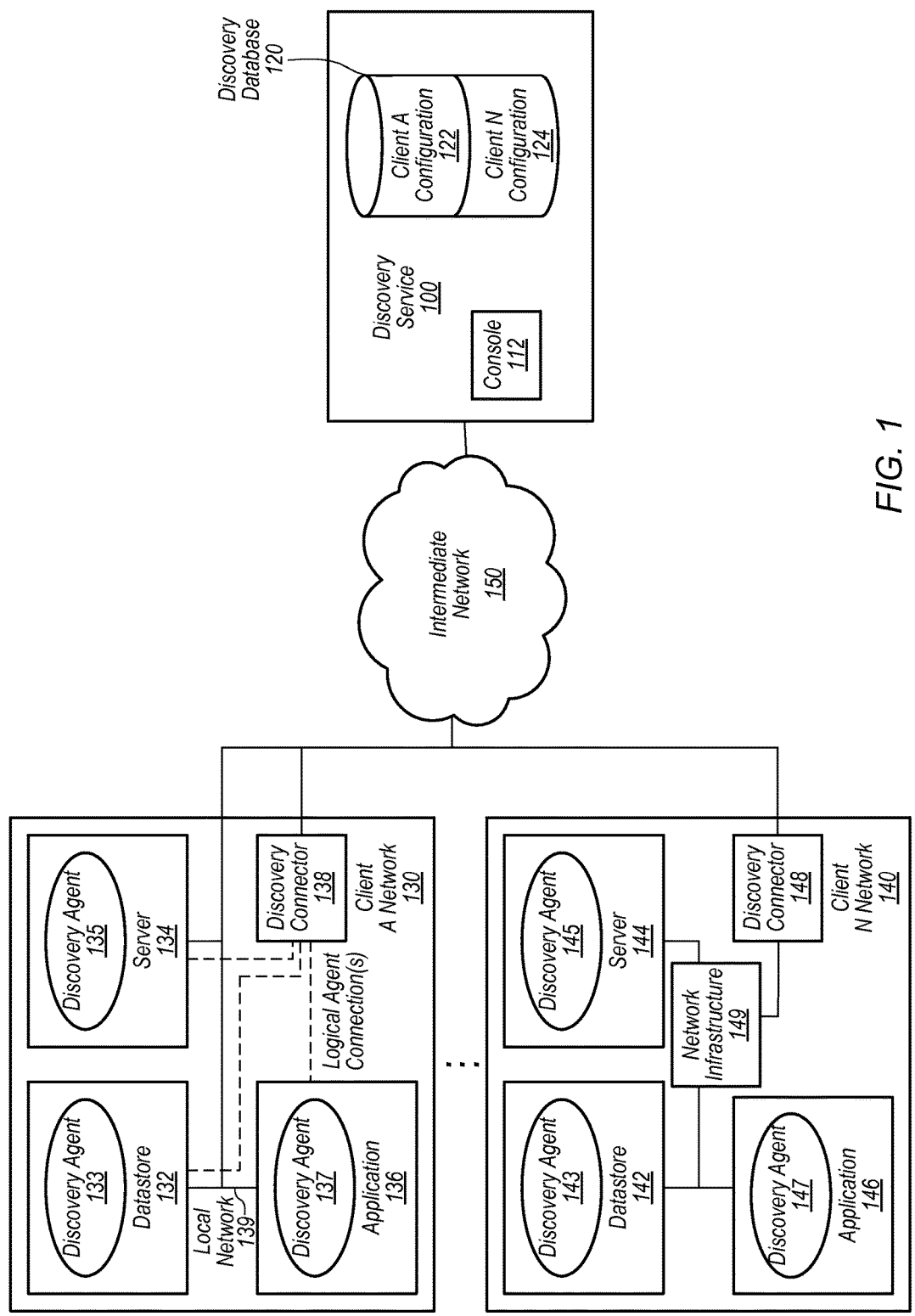
FIG. 1 illustrates an example system environment in which a discovery service operates, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus provide a client resource discovery service that is designed to help customers of the service automate discovery of their enterprise IT assets (e.g., clients), whether those assets are spread across some private cloud-based service provider and/or on-premises datacenter environments of the customer. In embodiments, the service records the findings in a database, and keeps the database up-to-date with ongoing changes. The client resource discovery service (or "discovery service") may provide customers with a discovery platform for collecting, storing, and analyzing this information.

Such information may be useful for a number of reasons. For example, the service (e.g., a network-based discovery service) may simplify the task of migrating workloads to a cloud-based service provider by identifying some or all resources that power a client's application—typically a combination of servers, databases, and file shares—and tracks configuration and performance changes throughout the migration process.

Generally, the discovery service may provide a central place where customers may sign up for the service, install necessary discovery components, analyze collected data and monitor health of the discovery service. Public APIs may be provided to view and populate the discovery data. An interface for installation of the system components may reduce manual and/or engineering effort as dependency management for the agent installation may be largely self-contained with minimal to no dependency on host configuration, in embodiments. In some architectural embodiments, the connectors and the agents that live on-premise are light-weight and processing of the data may be moved out of the premises and may be handled by the service provider. Connectors and agents may generally be referred to as client network-based resources, in embodiments. Configuration of client network-based resources may be referred to as client network-based resource configurations, in embodiments. The discovery service may be able to collect the discovery data from a customer's on-Premise hosts (e.g., clients of the service) service as well as service provider compute instances that execute on behalf of or at the direction of the customer. In embodiments, the discovery data may be collected from the clients securely. For example, there may be encryption for data at rest and data in transit.

FIG. 1 illustrates an example system environment in which a discovery service operates to provide client resource discovery services, according to at least some embodiments. The illustrated system environment includes multiple components including a discovery service 100 that provides client resource discovery services, and is illustrated with a console 112 (e.g., a web-based console or the like) and discovery database 120. Generally, customers deploy components of the discovery service 100 and manage the discovery service 100 via the console 112. Various data is obtained from various different customer networks and stored to discovery database 120 (e.g., client A network 130 configuration data is stored as client A configuration 122 in discovery database 120, and client N Network 140 configuration data is stored to discovery database 120 as client N configuration 124). The illustrated embodiment also depicts two client networks A 130 and N 140 out of numerous possible networks A . . . N. In some embodiments, the networks may be distributed networks A & N of a same single enterprise while in other embodiments, the networks may be enterprise networks for distinct enterprises A and N or various combinations thereof.

Client A network 130 is depicted with datastore 132 and corresponding discovery agent 133, server 134 and corresponding discovery agent 135, application 136 and corresponding agent 137, as well as discovery connector 138. Local network 139 (e.g., an enterprise WAN/LAN or other network) links the datastore 132, server 134, and application 136 to one another as well as to an intermediate network 150 (e.g., the Internet). Logical connections between the discover connector 138 and the datastore 132, server 134, and application 136 are also depicted. In some embodiments, the local network may also link the discovery connector 138 with the datastore 132, server 134 and application 136 and/or the corresponding agents. Generally, the configuration of customer networks and network resources (e.g., clients) of that network may be referred to as a client network-based resource configuration, in embodiments.

In FIG. 1, client N network 140 is depicted with agents that correspond to various respective resources. Client N network 140 is depicted with datastore 142, server 144, application 146 and corresponding agents 143, 145, 147, as well as discovery connector 148. Additional and/or alternative features of the components that make up the various embodiments of the discovery service environment are explained below.

Figure 2:
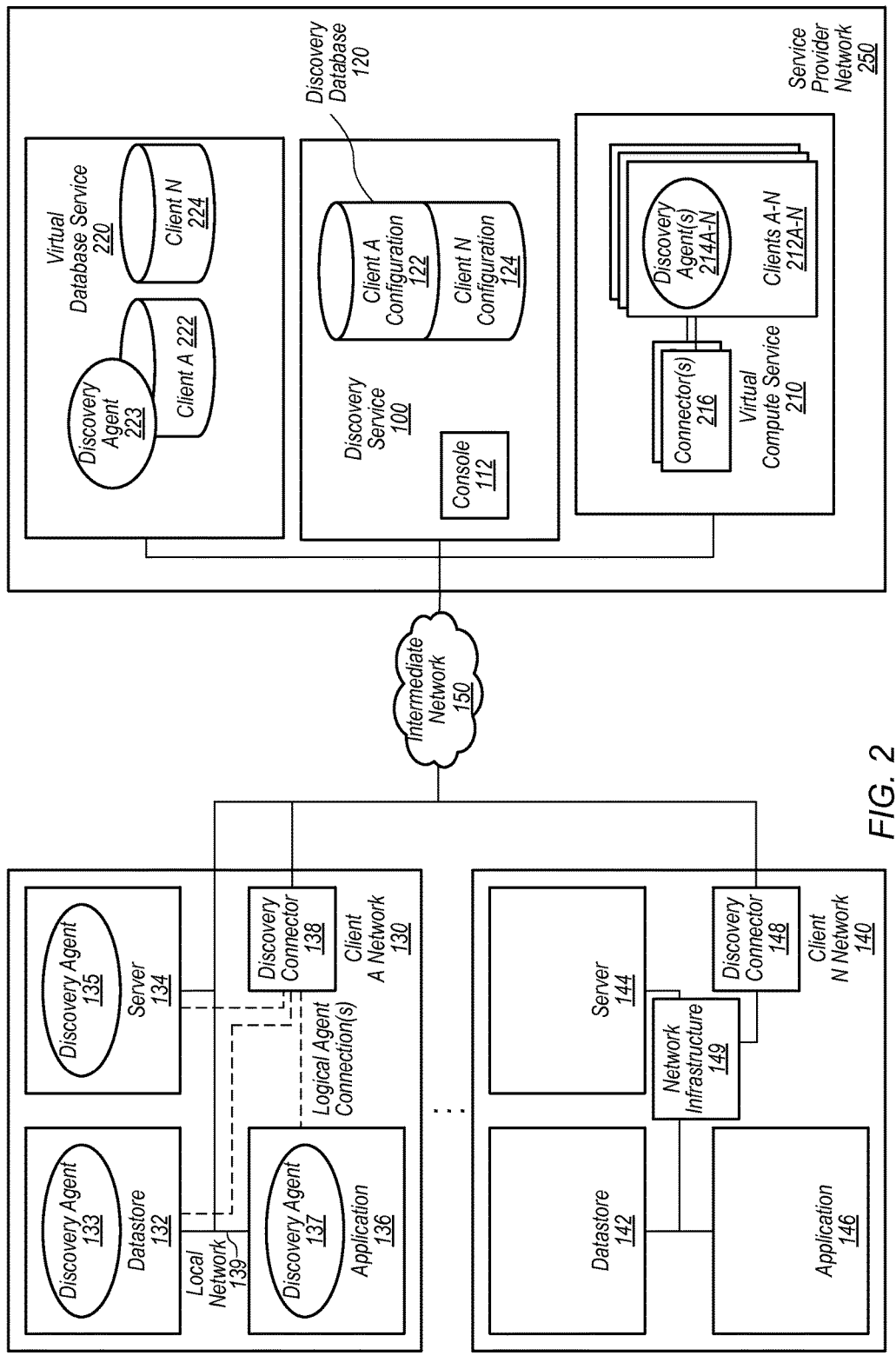
FIG. 2 illustrates an example service provider system environment in which a discovery service operates, according to at least some embodiments.

Note that in FIG. 2, client N network 140 is depicted without agents (e.g., an agentless implementation of the discovery service on the client network). Client N network 140 is depicted with network infrastructure 149 (e.g., a switch or firewall), datastore 142, server 144, application 146 as well as discovery connector 148.

In embodiments, client-side discovery components may include one or more agents, one or more discovery connectors, one or more third-party discover tools or some combination thereof.

Architectural Components

Components of the disclosed network discovery service allow customers of the service to discover their enterprise IT assets spread across AWS and on-premises datacenter environments, record the findings in a database, and keep the database up-to-date with ongoing changes, in embodiments. The service simplifies the task of migrating workloads to AWS by identifying all resources that power an application—typically a combination of servers, databases, and file shares—and tracks configuration and performance changes throughout the migration process, in embodiments.

Discovery Service

In embodiments, the discovery service (e.g., discovery service 100) includes all the components that implement discovery-specific workflows. For example, the agent service/data collection module 450 collects discovery data from agents installed on behalf of a customer (e.g., instances of the service provider as well as the customer's on-Premise hosts (e.g., hosts on the customer's own enterprise network)). The agent service/data collection module 450 may register itself with the agent service and provide a location at which it will receive the discovery data.

Functionality implemented by the agent service/data collection module 450 may include starting/stopping the data collection process for a client, gathering health information for the connector and agents from the agent service, communicating the configuration information to the agent service, and processing the discovery data.

In some embodiments, the configuration information by the agent may include identification of one or more of: software packages installed on the computer system, processes running on the computer system, type of server running on the computer system, type of operating system on the computer system, source entities for network communications received at the computer system, destination entities for network communications sent from the computer system, or performance of a process running on the computer system. In some embodiments, configuration information may include network information, performance information, component health information and/or dependency information. The configuration information may include identification of one or more of: software packages installed on the computer system, processes running on the computer system, type of server running on the computer system, type of operating system on the computer system, source entities for network communications received at the computer system, content of network communications received at the computer system, destination entities for network communications sent from the computer system, performance of the computer system, or performance of a process running on the computer system. The information may include security-related configuration information (e.g., which ports are open).

In embodiments, new customers may sign up for the discovery service using their service provider credentials. Once signed up, they may provide: an encryption key for encrypting discovery data, and an access point for receiving notifications.

Discovery Console

The discovery console (e.g., console 112) is the user interface for the discovery service, in embodiments. The console may be configured to allow the customers to sign up for the discovery service, monitor the health of the installed components (e.g., connector, agents), change configurations of the connector, discovery agents and the collection process, and download the connector and agents. While, in some embodiments, the customer may manually install these components, other embodiments may provide for an automated installation.

For example, the console may be configured with user interface elements that, when selected by a user, cause the system to download, install, and setup a connector virtual appliance (in embodiments, the downloaded virtual appliance is bundled together with the connector) in the enterprise datacenter.

The console may be configured with interface elements that allow customers to optionally configure discovery data collection to change the defaults for data captured and capture frequency. In embodiments, the console may be configured with interface elements that allow a user to query, analyze and/or export the discovery data using the console. Public APIs may be provided to offer similar functionality.

The console 112 may be configured with interface elements to allow customers to export the discovery data, attributes and dependencies between a list of servers (e.g., as XML, CSV, and JSON files), in embodiments.

In some embodiments, the console is configured to provide workflows that allow customers to perform agent-less discovery (e.g., using the connector). The console may include interface elements such that customers can scan and enumerate servers and other IT assets right from the console, in embodiments. The console may also be configured with interface elements such that customers can manage the deployment of the agents to servers right from the console (e.g., aided by the connector).

Discovery Connector

The connector (e.g., discovery connector 138, 148) supports configuration of the service and may act as an Internet gateway for the on-premises discovery agents, in embodiments. Generally, in some embodiments (e.g., FIG. 1), the agents gather discovery information and report it back to the discovery service through the connector. The connector may be configured with long-term credentials to the service, receives discovery data from the agents, and aggregates and pushes data to the discovery service, in embodiments. The aggregation may be performed by the agent, by the connector, or by the service, in embodiments.

The discovery connector component (e.g., discovery connector 148) may be downloaded to, and operated in the customer's network environment and may responsible for collecting the discovery data, in embodiments. In one example implementation, once customers sign up for the discovery service they will be presented (e.g., via the console) with a link to a service provider location for downloading the connector. For example, the customer may install the connector and run it on a virtual machine in the customer's enterprise data center. The connector acts as the local on-Premise manager for the discovery service, in embodiments. The connector may provide any or all of the following functionality: authenticate the agents installed on hosts, collect the discovery data from the agents, aggregate the data, and send the aggregated data to the discovery service, monitor the health of these agents and send this information to the agent service, obtain encryption keys and communicate them to the agents, communicate configuration info to the agents, and obtain IDs from the agent service and assign them to the agents.

Customers may install more than one connector in their on-Premise environment. Each connector may be identified by an ID generated by the agent service, for example. In some embodiments, the agent service may send messages to the connector via a message service (e.g., message queuing service) or may piggy back on health messages that the connector sends.

In embodiments, the connector, which may be a virtual appliance made available for download from the service provider network is installed and run on a virtual machine in the enterprise datacenter. Customers may sign into the connector. Once signed in, the service may bootstrap and personalize the connector with a unique identity, trust certificates, and the configuration information for the different services.

In some embodiments, the connector may be configured to communicate directly with on-premise infrastructure (e.g. FIG. 1, item 149; a switch; firewall, router, etc.). For example, a discover connector (e.g., 138 in FIG. 3) may be configured to send requests to, receive data from or monitor a firewall (not illustrated), or the traffic passing through the firewall of client network 130.

Example Connector Setup:

Once a virtual machine is created with the downloaded connector's image, the customer may be required to open up a preconfigured location (e.g., url) for setting up the connector. In the example, some or all of the following information may be requested from the customer: the user that has the necessary permissions to talk to the agent service, a signed certificate (along with the private key) which may be used for SSL, and a self-signed certificate.

The connector may be configured to provide a setup wizard, once installed. The setup wizard may configure any common services (e.g., common services of the service provider such as network-based services for example) as well as steps specific to the chosen services (e.g., the discovery or other service). The common configuration setup may include setting up network connectivity, installing certificates, and configuring platform credentials on the connector. The network setup wizard may be configured to allow customers to choose static or dynamic IP address for their connector and optionally configure web proxy server to access services of the service provider.

In embodiments, the setup process may track mandatory metrics like the version of software deployed, outcomes of various stages of the setup like network setup, configuration of an authentication provider, creation of trust certificates, etc., and the final success or failure of the setup workflow. Such metrics may be relied on to identify and resolve problems faced by customers during setup. Customers can optionally share additional metrics related to configuration choices, type and versions of hypervisor platforms, and type and versions of server operating systems, etc.

In embodiments, the system may provide an option to run the connector in an audit mode. For example, when this mode is chosen, all or some of the discovery data collected locally may be available for the customer for auditing. This data may be sent to the discovery service only when the customer manually approves, in embodiments.

In the example, the configuration file that has information about the agent service end points may be automatically downloaded. A message queue service may be created on the customer's behalf and the queue's information sent to the agent service.

In embodiments, some or all communication between the agent service and the connector is handled through the message queue service. For example, whenever the service needs to send a command to the connector, it may enqueue a message in the connector's specific message queue service. Each message may be identified by a unique message id. The connector may continuously long poll the queue for new messages, and act upon the new messages. Responses to the request from the connector may automatically be sent to the agent service using the same message id, for example.

The connector may also maintain a small local database. This database may be used to store information like: the encryption key obtained from the Back End Service (e.g., This key is rotated every "x" hours), the list of agents, their ID's, IP and Mac addresses, etc. Note that in some embodiments, customers may use static IP address for the connector, although a dynamic address scheme may be used in other embodiments.

Once the service and connector appliance are setup, the discovery service presents a user interface (e.g., a web-based user interface) as part of the management console, in embodiments. This interface may be used to configure and perform discovery. The connector 148 may be configured act as the point of contact for service in the enterprise datacenter and orchestrate all discovery related actions initiated from the service console. The console will implement workflows to start and stop data gathering on servers and configure data aggregation and data upload policies, in embodiments. Customers will also be able to export the discovery data in a JSON format from the console, in embodiments. In addition to the console, the service will provide APIs to programmatically access the discovery data, in embodiments.

In embodiments, the discovery service console may provide workflows that allow customers to perform agent-less discovery using the connector. Additionally, the system may provide customers with functionality to scan and enumerate servers and other IT assets right from the console.

In embodiments, the connector provides common functionality for the service provider, like a virtual appliance platform, application setup, ability to push upgrades, logging, troubleshooting, etc. In embodiments, a connector will also provide a framework for creating and running platform services.

The connector may also provide an agent plugin framework that can serve as a repository for agent software for various provider services delivered as plugins. When customers configure a particular provider service, the connector can install and enable the use of that particular agent plugin.

In embodiments, the discovery service is configured to provide a public facing endpoint, which clients will be able to call when they want the discovery service to take a particular action. In some instances, the discovery service will provide a messaging framework for communicating with each connector instance, in which each connector instance long-polls the service to determine its instructions. The connector maintains a persistent connection with each agent or lets them poll for work that they need to do depending on the time sensitivity of the use case being supported by the agent, in embodiments. Using this mechanism, clients can effectively trigger on-premises actions, including all the way down to the agents, without having to allow inbound network connections to their enterprise datacenter, for example.

In embodiments, the connector acts an Internet gateway and enables a simplified network setup for the agents to communicate with the discovery service. In addition to this, the connector is configured with long-term credentials to the service provider, and aggregates and pushes data to the discovery service, in embodiments.

Agents

The discovery service provides client with software agents that can be installed on servers to collect data (e.g., data needed to plan their application migration efforts). Before or after installing the connector, clients may download the agents (e.g., discovery agents 133, 135, 137, 143, 145, 147, etc.). Some or all of the agents may be available from the service provider, for example. In embodiments, the agents are responsible for collecting data from a host and communicate that to the connector. The user may be able to select the following configuration on the agents, in embodiments.

Types of data that the agent may collect may be variable (e.g., static data, dynamic data, etc.).

Hostname/IP address of the connector and the port on which the agent can send the information to the connector Generally, an agent-based approach may capture more information about client workloads and their dependencies than agentless approaches can capture. The additional information may include inter process dependencies, OS level monitoring data, and running applications, for example.

Agents can be installed on on-Premise hosts or service provider instances. Agents may be configured to operate in various environments (e.g., Windows and Linux families). Agents may also store a list of service tags (in the configuration file), which may be appended to the data the agent collects.

Agents Installed on On-Premise Hosts

For the agents installed on on-Premise hosts, customers may be provided with the ability (e.g., via configuration or interface) to bundle the agents with certificates that the connector uses for authentication (this certificate may be different than the certificate that the connector uses for SSL). For example, the customers can either use their personal certificates or create a self-signed cert at the connector. The connector then holds on to the public key of this certificate, in embodiments. In some embodiments, registration certificates may be generated at the connector, while in other embodiments registration certificates may be generated at the agent service.

Agent Authentication

In some embodiments, the connector may authenticate the agents in the following way: for example, initially when an agent becomes active, the agent contacts the connector and sends the agents IP address, hostname and Mac address details (the connector is authenticated using the certificate installed on it). The connector receives an ID from the agent service, and sends it to the agent. The agent encrypts the D with its private key and sends it back to the connector. The connector decrypts the ID with the public key (of the agent that it stored previously) and if it matches to what it sent—the agent is authenticated. From now on, this ID is used to identify the specific agent.

For sending discovery data, the agents may get an encryption key from the connector, encrypt the data and post it onto the connector, in embodiments. In some examples, the ACK messages may be used for piggybacking any configuration related changes to the agent. All or some configuration related to agent may be stored in a configuration file on host.

Agents Installed on Service Provider Instances

The agents can also be installed on service provider instances (e.g., as illustrated in FIG. 2, items 233, 214A-N), in embodiments. These agents may be preconfigured with the agent service end points to send the discovery data (through a configuration file uploaded to the service provider network). These agents may directly communicate with the agent service (e.g., no connector). These agents may use the instance role for authentication and communication with agent service end points, for example. These agents may be given an ID from the Agent Service. In embodiments, when an on-Premise instance is migrated to a service provider, the corresponding agent may be given a new ID. The old ID may be retained on the agent for reference purposes.

Agent Service

The agent service (e.g., depicted in FIG. 4 as item 450) may be an internal service of the service provider that helps in managing the agents that collect data from hosts. Example functionality of the agent service may include registration of agents and a connector (described below), providing ID's, service tags and/or configuration values to agents and/or the connector, providing encryption keys to agents and/or the connector, providing agents and/or a connector with details and the temporary credentials for accessing a data stream, collecting health information of agents and/or connector, instructing the agents and/or connector to start/stop data collection, receiving data collection requests from internal services of the service provider, and/or distributing the collected data to data streams provided by these services In embodiments, the agent service provides a common framework that can be used by some or all of the service provider's internal services (e.g., internal services that are interested in collecting data from agents installed on service provider compute instances) and/or a customer's on-Premise hosts. In embodiments, on launch both the discovery service and the inspector service may be authenticated to use the agent service.

The discovery service may also be configured for agent-less discovery using the connector. The connector (without deploying agents) may be configurable to obtain a list of customer's datacenter inventory. Client N network 140 illustrates such an architecture in FIG. 2. Agent-less discovery from connector 148 may include setting up credentials for WMI (Windows Management Instrumentation), SSH (secure shell), and SNMP (Simple Network Management Protocol) based discovery, in embodiments.

In embodiments, a connector could provide customers with a low-friction alternative to deploying agents themselves. For example, connector-managed installations provide customers (via combination of the console and connector) with functionality to configure and deploy discovery agents to target servers. In the case of virtualized enterprise datacenters, the servers are typically VMs running on a bare metal hypervisor, in embodiments. Examples may include workflows for identifying target machines using agent-less discovery, deploying agents to machines, defining lengths of data gathering, etc. The connector could then deploy agents into the target machines using a variety of techniques that include use of hypervisor level APIs (vSphere API, PowerShell) or operating system level APIs (WMI, SSH), for example. Customers could then configure the user accounts and credentials required to execute these APIs via the connector, in embodiments.

The following approaches can be used to provide various levels of agent-less discovery.

The system may be configured to provide a basic version of agent-less discovery by discovering an inventory of VMs (e.g., using vCenter APIs). For example, this feature may capture names of VMs, VM containers like datacenters, host clusters, ESX hosts and vCenter folders, their static virtual hardware configurations like provisioned CPU, Network, Storage, and Memory capacity, and running operating systems. The system may provide customers with an interface that can filter VMs based on these varying criteria to come up with a list of servers they want to put the agents on, in embodiments.

WMI, WinRM, and SSH: In embodiments, the system may be configured such that customers can setup the connector with a valid user account on their servers, at which point agent-less discovery can be performed using WMI, WinRM or SSH based techniques for remote command execution. For example, in an enterprise datacenter environment, where user accounts and authentication are typically managed through a central service like Microsoft Active Directory (AD), create a user account in the AD server and push the credentials to all of the servers.

SNMP: In embodiments, the system may be configured such that customers can configure SNMP in their servers with specific MIBs that would allow connector to fetch system configuration and network connections from Linux servers.

Advanced vCenter APIs: In embodiments, the connector will use advanced vCenter APIs to exploit constructs like vSwitch, vApp, and VM port groups to obtain relationships between VMs that can indicate a set of related VMs into which customers can inject the agents.

Nmap: In embodiments, the connector will use the open source Nmap tool to scan targeted hosts for services running in them based on standard port numbers published by the IANA.

Network packet capture: In embodiments, the system may be configured such that customers can setup their physical or virtual switches to mirror ports to the connector which will have the capability to identify network protocols, application signatures, generate flow records, and deduce network connections between servers using this data.

Externalize using public APIs: In embodiments, the system may be configured such that customers can write custom scripts to obtain this information from their private sources of this data including enterprise CMDBs to bootstrap the discovery service with the agent-less discovery data.

In embodiments, customers can manually employ one of the techniques described above or interview the application owner to come up with the first server or set of servers they want to put an agent on.

In embodiments, customers can use their existing deployment tools or tools from other software vendors to deploy agent software to target servers.

Discovery Database

Discovery information specific to a customer may be stored in the discovery database (e.g., discovery database 120). The discovery database may be a database or other type of datastore, in embodiments. The data store may store static data, dynamic data and/or configuration data (e.g., with respect to discovery). In embodiments, a combination of data stores may be chosen to represent the nature of the data. For example—static data (like IP, hostname etc.) may be stored in a NoSQL database whereas data representing the communication between different hosts can be stored in a graph database). In embodiments, data stored in the data store may be encrypted. Customers/third party vendors may write tools to analyze/visualize the collected discovery data (e.g., making use of the Public API service).

The following, non-exhaustive, list of kinds of data that may be gathered is arranged as three broad categories of information for purposes of illustration. The list is indicative of the types of information, but not exhaustive.

Static configuration

Server hostnames, IP addresses, MAC addresses

Static CPU, network, memory and disk resource allocations

DNS servers used

Names of installed applications from servers

List of installed business applications from web/application containers

List of actively running processes from servers

Time series performance metrics

CPU usage

Memory usage

Network Throughput And Latency Observed

Disk usage

Relationships

Established network TCP and UDP connections and associated processes

Network ports which servers are listening on and the listening process

The following is representative of an example ontology of the discovery database 120. This list is not complete and does not cover every object that can be represented in the discovery database. For example, this particular list may be associated with objects required to represent the data captured from a SharePoint application. Other lists associated with other objects and other applications are contemplated as well.

Class: Server

Description: Describes information about server/host. May have descendants based on operating system or other parameters.

Attributes: Hostname, Serial Number, Manufacturer, OS, OS Version, CPU, CPU Speed (GHz), CPU Cores, Disk Count, Disk Space, Memory (GB), Is Virtual, NIC Count, DNS server, Default Gateway, Custom (Allows for custom client data)

Class: Database

Description: Database can extend both Server and Software. Contains more specific information related to databases. May have descendants based on type (for example MySql).

Attributes: Name, Vendor, Version, Type, Allocated memory, Allocated space, Custom (Allows for custom client data), Class: Software Description: Covers applications and software, which are required by a service. An application runs on one or more servers. Also can be refereed as Installed software. May have descendants based on type (for example database).

Attributes: Name, Vendor, Version, Type, CMDLine, Custom (Allows for custom client data).

Class: Process

Description: Process is an instance of a computer program that is being executed. It contains the program code and its current activity. The running software can have several processes. You can assume that the process is the connection between server and application.

Attributes: PID, Name, CMDLine, Parameters, StartupTime, User, Priority, Custom (Allows for custom client data)

Class: Connection

Description: Keeps track of information about established connections between servers.

Attributes: Source IP, Source port, Destination IP, Destination port, Protocol, Custom (Allows for custom client data), link to the process (optional).

Class: IP Subnet

Description: A subnetwork, or subnet, is a logical, visible subdivision of an IP network. The practice of dividing a network into two or more networks is called subnetting. Computers that belong to a subnet are addressed with a common, identical, most-significant bit-group in their IP address.

Attributes: IP network address, IP network mask, IP address type, Custom (Allows for custom client data), links to servers in subnet Class: NIC Description: A network interface controller (NIC, also known as a network interface card, network adapter, LAN adapter, and by similar terms) is a computer hardware component that connects a computer to a computer network.

Attributes: Capacity, MAC Address, Subnet, Local IP, Global IP, Custom (Allows for custom client data)

Class: Disk

Description: Tracks of storage information associated with a host.

Attributes: Type, Description, Disk Space, Name, Volume Serial Number, Custom (Allows for Custom Client Data)

FIG. 2 illustrates an example service provider system environment in which a discovery service operates, according to at least some embodiments. In the illustrated embodiment, discovery service 100, client A network 130 and client N network are depicted as similar to the corresponding networks in FIG. 1. In the depicted embodiment, discovery service 100 is illustrated as part of a service provider network 250. Service provider network 250 may be a cloud-based service provider that provides various compute services to various and numerous distinct clients, in embodiments. For example, Service provider network 250 is illustrated with virtual database service 220 that includes client A database 222 (with corresponding discovery agent 233) and client N database 224. Virtual database service 220 may be provided to various distinct clients of the service provider (e.g., clients A . . . N). In some embodiments, data stored in the virtual database service 220 may be accessed by virtual compute workloads of any of client's A . . . N that are operating on the service provider network 250, or by client components on the customer's network (e.g., client networks 130/140). Service provider network 250 is also depicted with virtual computer service 210 that includes clients 212A-N (with corresponding discovery agents 214A-N) and connector(s) 216. The virtual compute service 210 may provide compute services to clients A-N, in embodiments. The discovery service 100 may discover client configurations for both clients of the customer's own enterprise network and/or clients or resources operated on behalf of the customer in the cloud (e.g., on the service provider network). For example, the virtual compute service may be configured with discovery agents (as depicted) and or with a discovery connector (not illustrated) that perform discovery on instances of the compute service on behalf of respective customers, in embodiments.

In some embodiments, the services provided by the service provider may provide an interface for gathering data without the use of an agent. For example, data may be gathered from the virtual compute service (e.g., 210) by querying an API of the service (e.g., method data APIs or a logging tool of the virtual compute service).

Figure 3:
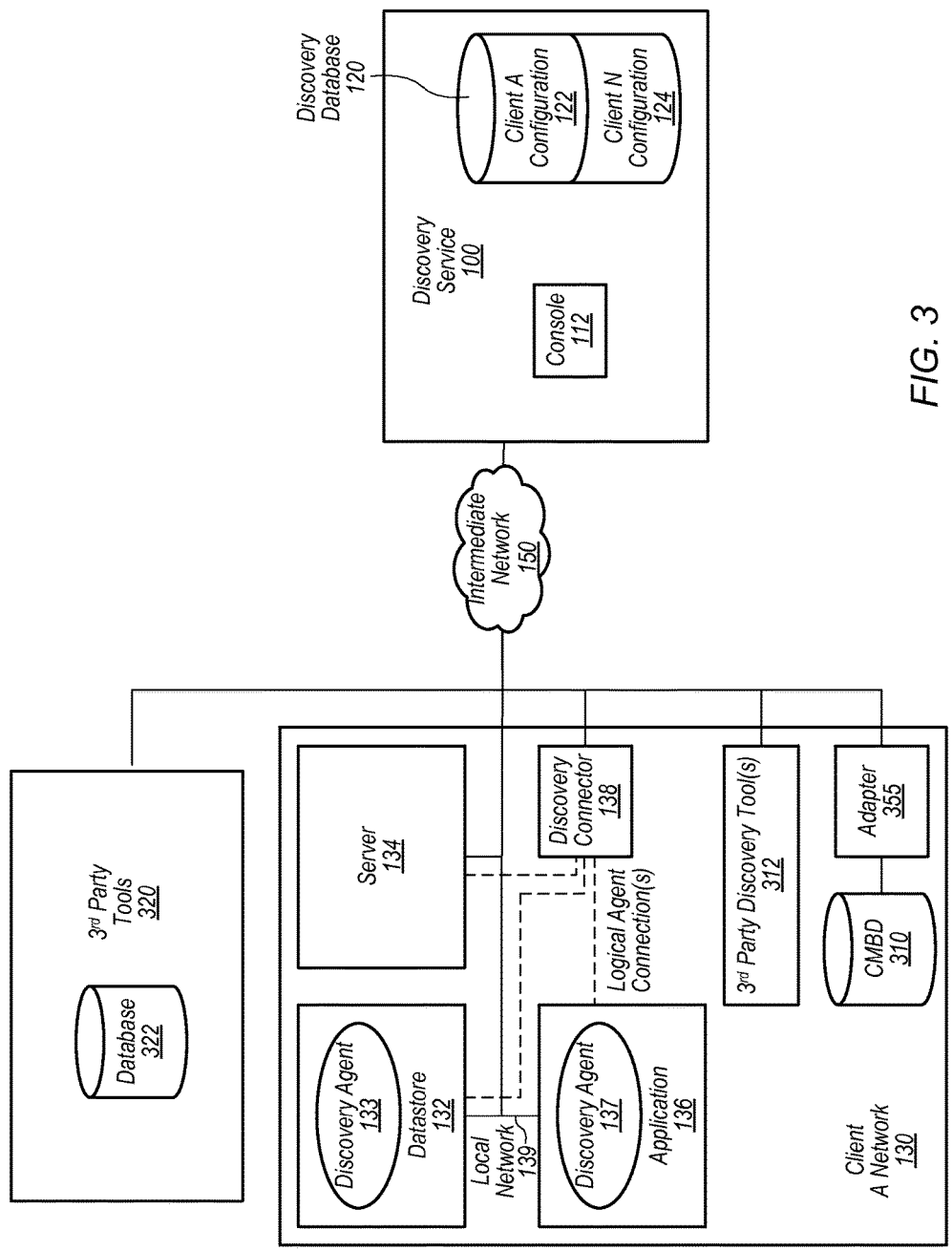
FIG. 3 illustrates an example system environment with third-party tools and a configuration management database in which a discovery service operates, according to at least some embodiments.

FIG. 3 illustrates an example system environment with third-party tools and a configuration management database, in which a discovery service operates, according to at least some embodiments. Client A network 130 is depicted with third party discovery tool(s) 312, and a configuration management database 310 that is connected to the discovery service by discovery connector 138. In the illustrated embodiment, the environment also includes third party tools 320 and database 322 that may connect to the discovery service 100 and/or client A network 130 via intermediate network 150 (e.g., the Internet, a private or public WAN, or the like, etc.).

Figure 4:
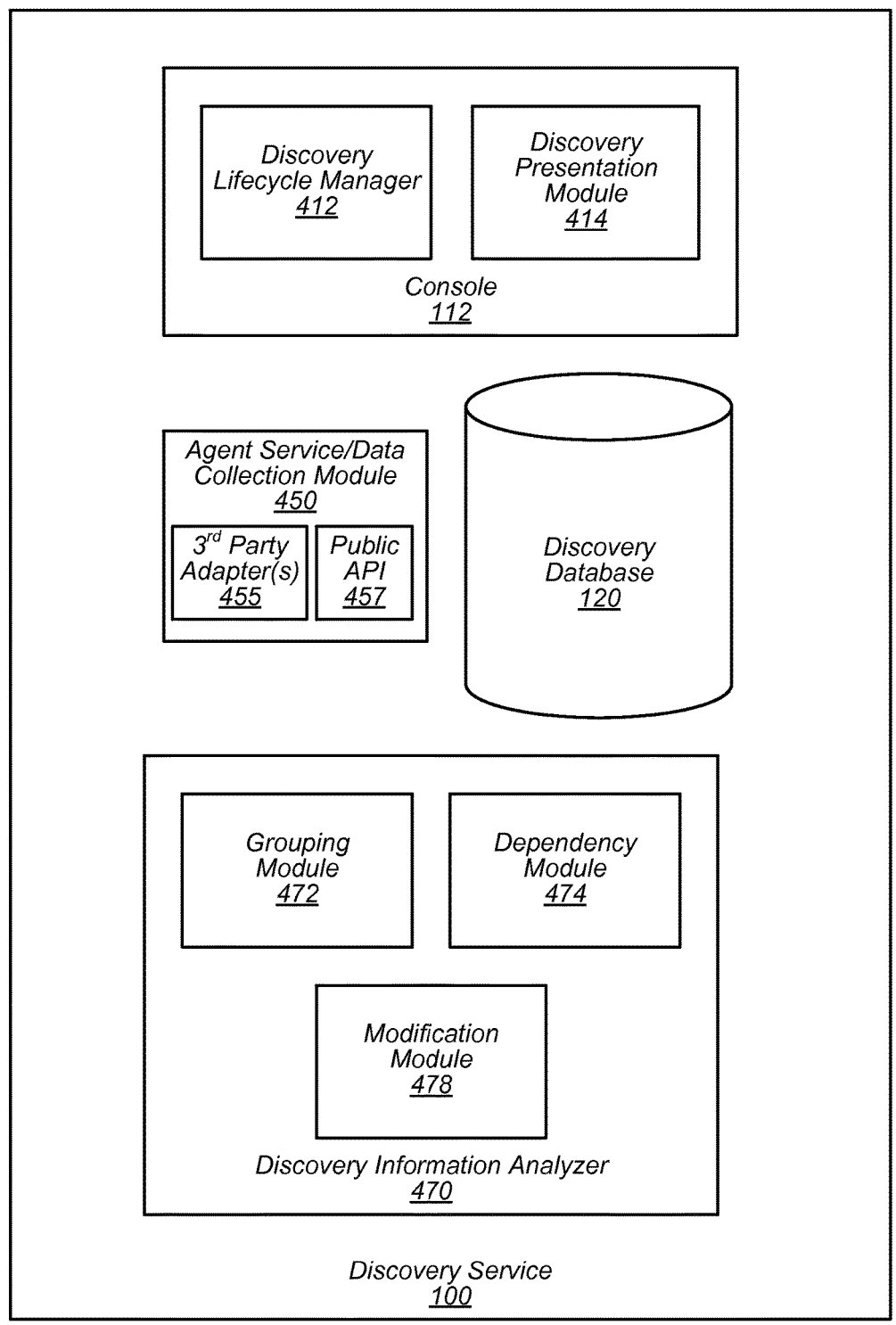
FIG. 4 illustrates a block diagram of an example organization of the components of a discovery service, according to at least some embodiments.

FIG. 4 illustrates a block diagram of an example organization of the components of a discovery service 100, according to at least some embodiments. One or more components of the depicted discovery service may perform some or all of the processes illustrated in FIGS. 5 and 6 for example. The illustrated discovery service 100 may, based on analysis of data, identify software running inside servers (e.g., bare metal servers) and virtual machines and map dependencies between the workloads that make up an application, in embodiments.

For example, the depicted discovery service 100 analyzes data from a data store and identifies installed software packages, running system and application processes, network dependencies of these applications, and their runtime performance, in embodiments. The discovery service 100 may discover network communications between applications and record network infrastructure dependencies for discovered applications in an enterprise datacenter or on compute nodes of a service provider. For example, the discovery service 100 may capture a snapshot of the application's health and performance (e.g., establishing a baseline to compare against after migration of the application to a service provider network). The data findings may be recorded in a discovery database 120, which may serve as a trustable picture of the customer's IT assets that make up that application, in embodiments. Customers can interact with this information via an interface (e.g., console 112) to find the workloads that make up an application, analyze dependencies, build migration strategies, and assess migration outcomes, for example. The discovery service may automate some or all of these functions, in embodiments.

Figure 5:
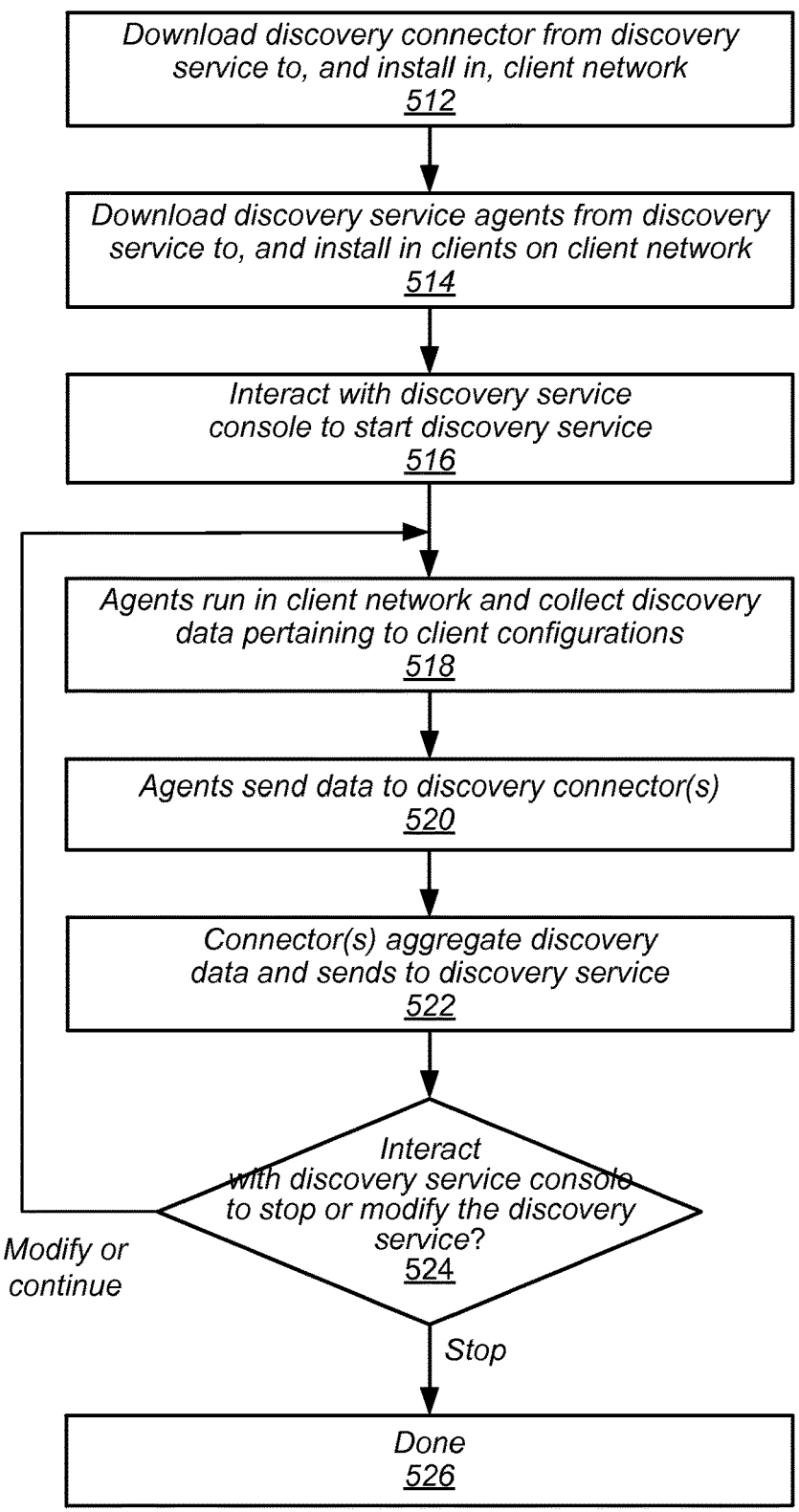
FIG. 5 illustrates an example flow diagram of a client-side process associated with a discovery service, according to at least some embodiments.
Figure 6:
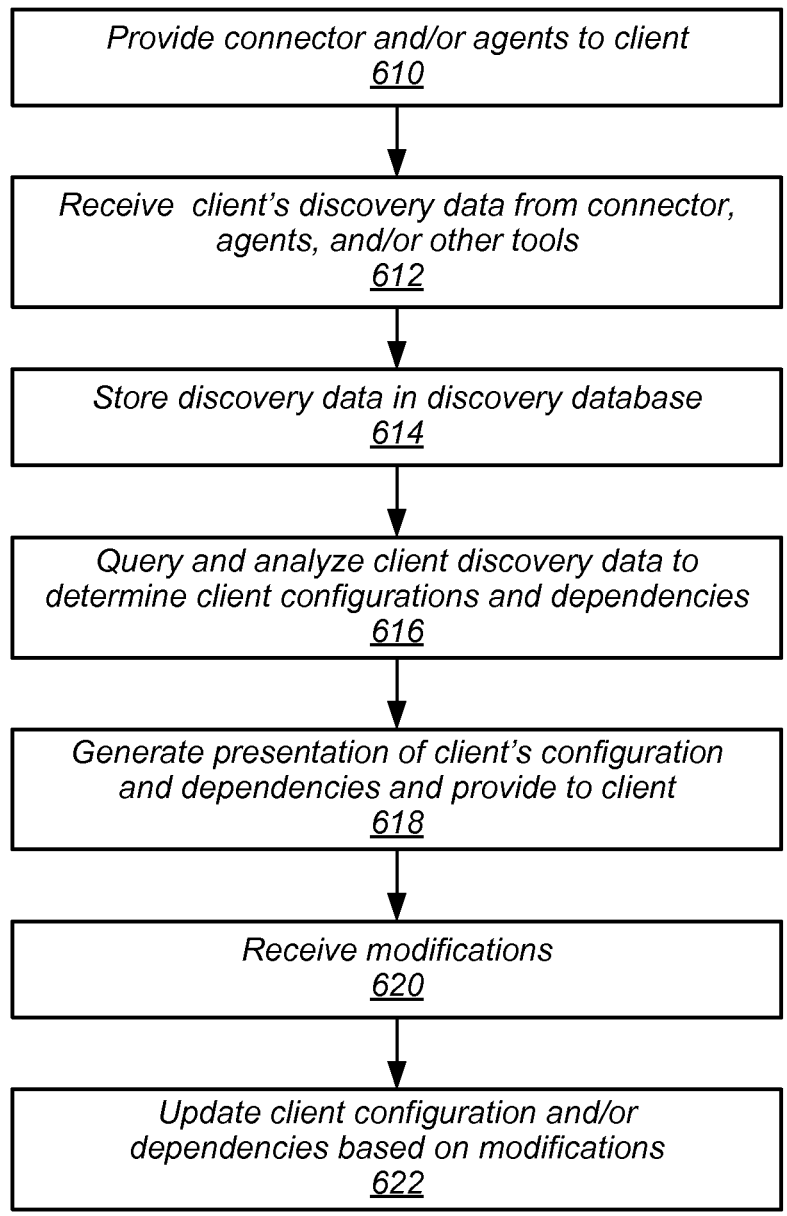
FIG. 6 illustrates an example flow diagram of a server-side process associated with a discovery service, according to at least some embodiments.

As illustrated in FIGS. 5 and 6, the process starts by deploying components including the agents, connectors, and discovery service 100, which collects the information (e.g., information needed to plan and monitor migrations) including dependency information and server utilization information. As the data is received from the agents and other collection sources, the data is added to the discovery service (e.g., added to the discovery database 120). The discovery service also allows 3rd party monitoring and discovery tools to deposit information in the discovery service's repository via public APIs (e.g., third-party adapters 455), so tools from third party providers can publish their findings to the database. Other adapters may be configured to provide an interface to other third-party configuration management databases to synchronize that data with the discovery datastore 120 repository.

Discovery Public API Service

A discovery public API service (e.g., depicted in FIG. 4 as item 457) may provide public APIs for customers to update/add the discovery data as well as to retrieve it. For example, customers might have discovery data in a configuration management database. In embodiments, public APIs 457 and/or third-party adapter(s) 455 provide tools to move this data to the discovery database. In embodiments, the APIs will primarily serve to read and write data to the discovery database 120. In embodiments, clients can access the APIs using SDKs available for Java, Python, and Ruby, for example.

At launch, the discovery service 100 may integrate with discovery solutions from third-party providers, which publish information to the discovery service; third-party migration solutions may leverage the discovered information to support client migrations; and third-party migration frameworks can provide a combination of analysis and migration support to customers based on the information discovered. This may be enabled through public APIs 457 and/or third-party adapters 455 that the service provides to read and write the discovery data. These program interfaces may enable partners to perform discovery and migration of proprietary and vendor-specific technologies that are not supported natively by the discovery service. They also enable customers, system integrators, and others to build project-specific discovery and migration tooling on top of the platform.

Customers or ISVs can write their own adapters for enterprise CMDBs. If customers have already invested in one of these products, they can import the data into the discovery database 120 using these adapters. If they continue to use these CMDBs, customers can periodically update the data in the discovery database with changes from their on-premises CMDBs. In embodiments, the discovery service may include adapters for on-premises CMDB solutions in this space.

System APIs may include APIs for adding configuration entries, modifying configuration entries, consuming stored data, etc.

Discovery Service APIs

The following is a non-exhaustive list of example APIs that may be made available via the discovery service. Additional APIs are also contemplated that implement more complex operations by combining the functionality of two or more of the basic ones defined in this document. The APIs have been grouped functionally into ExportConfigurations
GetConfigurationAttributes
ListConfigurationItem
GetExportStatus
RemoveConfigurationItem
<Tag API's>
CreateTags
DeleteTags
DescribeTags
API Structures
ExportConfigurations Description: Export the configuration data comprising of all discovered configuration items and relationships to the service provider storage service using the service provider storage service bucket and Key provided.

Input: BucketName: The service provider storage service bucket where the configurations are to be exported.

KeyPrefix: The service provider storage service key where the configurations are to be exported.

roleName: The role that the service would assume to access the bucket filter: This is a series or key=<value> or key~=<value> and supports logic operators separating them.

Output:

exportId: A unique identifier of the export request which can be used to query and find out the status of the export.

numberOfConfigurations: Count of configuration items that will be exported.

Exceptions:

AuthenticationFailedException: This exception is thrown when the credentials provided by the caller was not valid.

AuthorizationErrorException: This exception is thrown when the credentials are valid however the user does not have the policy to call this particular API.

InvalidParameterException: This exception is thrown when the API is called with a parameter which is not defined in the request. Review the available parameters for the API request.

InvalidParameterValueException: This exception is thrown when the API is called with a bad or out-of-range value was supplied for the input parameter.

ServerInternalErrorException: This exception is thrown when the errors are usually caused by the server-side issue.

GetConfigurationAttributes

Description: Get the list of attributes associated with a configuration item identified by the configuration item id Input: configurationIds: The list of configuration item identifier filter: This is a series or key=<value> or key~=<value> and supports logic operators separating them.

maxResults: # Of items to return nextToken: A marker to be used by the customer to list next list of items Output:

configurations: A map of configurationId and list of <key, value>. The key-value is represented as AttributeName and AttributeValue.

nextToken: A marker to be used by the customer to list next list of items

Exceptions:

AuthenticationFailedException: This exception is thrown when the credentials provided by the caller was not valid.

AuthorizationErrorException: This exception is thrown when the credentials are valid however the user does not have the policy to call this particular API.

InvalidParameterException: This exception is thrown when the API is called with a parameter which is not defined in the request. Review the available parameters for the API request.

InvalidParameterValueException: This exception is thrown when the API is called with a bad or out-of-range value was supplied for the input parameter.

ResourceNotFoundException: This exception is thrown when the configuration id provided by the customer is not found.

ServerInternalErrorException: This exception is thrown when the errors are usually caused by the server-side issue.

ListConfigurationItem

Description: Get a list of configuration items that match that specification identified by filter specification. The filter specification specifies conditions that apply to attributes associated with a relationship.

Input: configurationType: This is a valid type of configuration item recognized by the discovery service. Internally it will be an enum class.

filter: This is a series or key=<value> or key~=<value> and supports logic operators separating them.

maxResults: # Of items to return nextToken: A marker to be used by the customer to list next list of items Output:

configurationIds: List of configuration item ids nextToken: A marker to be used by the customer to list next list of items Exceptions:

AuthenticationFailedException: This exception is thrown when the credentials provided by the caller was not valid.

AuthorizationErrorException: This exception is thrown when the credentials are valid however the user does not have the policy to call this particular API.

InvalidParameterException: This exception is thrown when the API is called with a parameter which is not defined in the request. Review the available parameters for the API request.

InvalidParameterValueException: This exception is thrown when the API is called with a bad or out-of-range value was supplied for the input parameter.

ServerInternalErrorException: This exception is thrown when the errors are usually caused by the server-side issue.

GetExportStatus

Description: API to get the status of export request.

Input: exportId: A unique identifier for the export request. This can used to query and find out the status of the export.

Output:

exportId: A unique identifier for the export request.

status: Status of the export. (A set of fixed values)

statusMessage: Descriptive message for the current state of the export.

Exceptions: AuthenticationFailedException:

This exception is thrown when the credentials provided by the caller was not valid.

AuthorizationErrorException: This exception is thrown when the credentials are valid however the user does not have the policy to call this particular API.

InvalidParameterException: This exception is thrown when the API is called with a parameter which is not defined in the request. Review the available parameters for the API request.

InvalidParameterValueException:

This exception is thrown when the API is called with a bad or out-of-range value was supplied for the input parameter.

ResourceNotFoundException: This exception is thrown when the configuration id provided by the customer is not found.

ServerInternalErrorException: This exception is thrown when the errors are usually caused by the server-side issue.

RemoveConfigurationItem

Description: API to remove a configuration item

Input: configurationId: The id of configuration item that needs to be removed

Exceptions:

AuthenticationFailedException: This exception is thrown when the credentials provided by the caller was not valid.

AuthorizationErrorException: This exception is thrown when the credentials are valid however the user does not have the policy to call this particular API.

InvalidParameterException: This exception is thrown when the API is called with a parameter which is not defined in the request. Review the available parameters for the API request.

InvalidParameterValueException: This exception is thrown when the API is called with a bad or out-of-range value was supplied for the input parameter.

ResourceNotFoundException: This exception is thrown when the configuration id provided by the customer is not found.

ServerInternalErrorException: This exception is thrown when the errors are usually caused by the server-side issue.

CreateTags

Description: API to tag a configuration item

Input: configurationId: The configuration item id that needs to be tagged tags: List of key and values Exceptions:

AuthenticationFailedException: This exception is thrown when the credentials provided by the caller was not valid.

AuthorizationErrorException: This exception is thrown when the credentials are valid however the user does not have the policy to call this particular API.

InvalidParameterException: This exception is thrown when the API is called with a parameter which is not defined in the request. Review the available parameters for the API request.

InvalidParameterValueException: This exception is thrown when the API is called with a bad or out-of-range value was supplied for the input parameter.

ResourceNotFoundException: This exception is thrown when the configuration id provided by the customer is not found.

ServerInternalErrorException: This exception is thrown when the errors are usually caused by the server-side issue.

DeleteTags
Description: API to delete tags
Input: configurationId: The unique identified of a configuration item
    tags: List of key and values
    Exceptions:
    AuthenticationFailedException: This exception is thrown when the credentials provided by the caller was not valid.
    AuthorizationErrorException: This exception is thrown when the credentials are valid however the user does not have the policy to call this particular API.
    InvalidParameterException: This exception is thrown when the API is called with a parameter which is not defined in the request. Review the available parameters for the API request.
    InvalidParameterValueException: This exception is thrown when the API is called with a bad or out-of-range value was supplied for the input parameter.
    ResourceNotFoundException: This exception is thrown when the configuration id provided by the customer is not found.
    ServerInternalErrorException: This exception is thrown when the errors are usually caused by the server-side issue.
DescribeTags
Description: API to describe tags
Input:
filter:
This is a series or key=<value> or key~=<value> and supports logic operators separating them.
Output:
tags:
List of key and values along with the configuration type and configurationId
    Exceptions:
    AuthenticationFailedException: This exception is thrown when the credentials provided by the caller was not valid.
    AuthorizationErrorException: This exception is thrown when the credentials are valid however the user does not have the policy to call this particular API.
    InvalidParameterException: This exception is thrown when the API is called with a parameter which is not defined in the request. Review the available parameters for the API request.
    InvalidParameterValueException: This exception is thrown when the API is called with a bad or out-of-range value was supplied for the input parameter.
    ResourceNotFoundException: This exception is thrown when the configuration id provided by the customer is not found.
    ServerInternalErrorException: This exception is thrown when the errors are usually caused by the server-side issue.

FIG. 4 also illustrates a console 112 with discovery lifecycle manager 412 and discovery presentation module 414. The console may be configured to display interface elements associated with the status of the discovery deployment, data gathering and the like, in embodiments. For example, monitoring workflows may validate the installation and correctness in the functioning of deployed agents and the connector. In some instances, the health of the connector may be displayed in or by the console 112. The console 112 may provide interface elements that provide for management of the health status data that can be obtained from the latest data upload of the discovery data or even from ping messages in queue, for example. The health of discovery agents may also be displayed in or by the console 112. The agents' health may be posted onto the console periodically, for example. In some embodiments, error information regarding agents is also posted on the console In some embodiments the console 112 may be configured to receive changes to the discovery configuration. For example, the console 112 may be configured to receive input from a user that selects an option for changing the configuration of agents, encryption keys, notification service topics, etc. used by the agents and/or discovery service. Connectors may pull these or other settings (e.g., from a message queue) and place a response (e.g., place a message back in the queue). Agents on the service provide network may poll onto the agent service for the configuration related data, in embodiments.

The discovery service 100 may be configured to eliminate a significant amount of manual labor from enterprise migrations by automating the identification of applications and their dependencies, in embodiments (e.g., identifying what software workloads are running in servers and understanding their usage patterns). In the past, customers and IT practitioners gathered this data by interviewing application and IT teams within the enterprise to identify applications and their dependencies and put together IT inventory lists, dependency maps, and migration plans after months of manual labor. The discovery service may automate some or all of this functionality, including identification of some or all workloads that make up an application and the purpose of each of them. In embodiments, the discovery service 100 identifies what applications, if any, are dependent on the application they want to migrate. It may also identify network infrastructure services that each of the workloads that comprise the application depend on (e.g. DHCP servers, AD servers, DNS servers, network LBs, NAS appliances, etc.).

The discovery service 100 may be configured to export the discovery data, which can be used to visualize the workloads that make up the application and their dependencies, in embodiments. Visualization functionality may be provided by the discovery presentation module 414 and may also include network throughput and latency characteristics for each of those dependencies in a graph. In some instances, the system may be configured such that the customer can manually create (e.g., via the console or other interface) a migration plan with the data provided by the discovery service. (e.g., using a variety of service provider and/or 3rd party vendor tools for execution of migrations). In embodiments, the discovery service 100 may continue to provide visibility (e.g., via the discovery presentation module) into customer's applications after the customer's applications are moved to the service provider, so they can validate the success of the migration operation for example.

Discovery service 100 is depicted with discovery information analyzer 470 that includes grouping module 472, dependency module 474, and modification module 478. Discovery information analyzer 470 may be configured with components that generate plans and designs based on the data received from the agents (as well as additional input, as describe below, for example). Generally, the components of the discovery information analyzer 470 include program instructions that are executed by a computer processor to analyze the information in the discovery database 120, group the identified resources (e.g., servers, applications and other resources), generate graphical representations of the resources, and modify the groupings and/or representations in response to additional user input, in embodiments. Representations of the resources of a client or customer may be referred to as client network-based resource configuration representations, in embodiments.

The results may be displayed or otherwise presented to the customer (e.g., via the discovery presentation module 414). In embodiments, the system may be configured to present the results, the generated plans and/or the generated designs (e.g., to customer experts via the discovery presentation module 414) to the customer or to experts on behalf of the customer. The recipient may review these findings and update the recommendations, plans or designs (e.g., based on their own, additional, or other infrastructure knowledge). For example, an administrator, expert or other user of the system may interact with a design via the discovery presentation module to add to or otherwise modify the design (e.g., alter, add or remove a relationship, grouping or dependency).

In at least some embodiments, the discovery presentation module 414 may be configured to deliver graphing capabilities (e.g., such as a graph of workloads that comprise the application where the workload servers are the nodes in the graph and the dependencies are the edges). In a further example, the edges in the graph may also capture network throughput and latency metrics for that dependency. The discovery presentation module 414 may output instructions that cause a visual presentation of that information.

In embodiments, the discovery service 100 collects metadata on the customer's infrastructure, rather than raw client data; it may scrub the data it collects before sending to the database; and it may encrypt data both at rest and in transit, in embodiments.

In various embodiments, various functionality may be performed by one or more agents, by a discovery connector, or by various modules of the discovery service, or shared by some combination thereof.

For example, application discovery functionality may describe the systems capability to identify what application is running inside the workloads that have been identified by the customer as the application server or one of its dependencies that were identified. In embodiments, the data gathering requirements for this feature may overlap with 'dependency mapping.' Other functionality may include identifying business applications deployed within an application or web server container based on the capture data. In some embodiments, application containers and the contained business applications may be part of the system ontology, APIs, and user interfaces. Enterprise web/application server containers, such as Microsoft IIS and Apache Tomcat, may also be included, for example.

In some embodiments, the system may support web and application server containers, such as Red Hat JBoss, IBM WebSphere, and Oracle WebLogic. Some embodiments may support automatically mapping the names of the discovered processes to user-friendly application names for enterprise applications. Additional features provided by the system may include identifying enterprise application stacks (e.g. a LAMP stack) and/or identifying databases contained within a database management system application.

In embodiments, the system may be configured with the capability to capture a snapshot of the application's health and performance prior to the migration. The obtained data may be pushed, stored and retrieved from various datastores. Customers can use this data to determine if the migration was successful by comparing the health metrics, performance metrics, and data about active network connections from the application prior to and after migration.

For example, in embodiments, the dependency module 474 of discovery service 100 may be configured to build a graph of the network dependencies for client applications. The discovery service supplements this information with a basic collection of process and monitoring data that describes what is happening in each of the workload servers, in embodiments.

The dependency module 474 may be configured with the functionality to generate or map dependencies between the workloads that make up an application. For example, the dependency module 474 may discover network communications between applications and record network infrastructure dependencies for discovered applications. With past systems, customers may have relied on manual processes and interviews to identify these dependencies; automated discovery of these dependencies could make a significant impact.

In some embodiments, the dependency module may analyze network packet captures (e.g., performed by an agent or connector 148) or perform network flow analysis. At least some network packet capture techniques capture traffic at the hypervisor level (e.g., in order to account for inter-virtual machine traffic that may not traverse physical switches). In some embodiments, the discovery system will capture network packets from the virtual NIC ports and generate flow records by inspecting the packets. Data may also be obtained from network processing hardware offload devices that may exist as part of the service provider network 250. For example, an agent may run on, or receive networking data from, a network processing device attached to an interface (e.g., PCIe) of a host system, where the network processing device offloads at least some network processing functions from a main CPU of the host.

In some embodiments, these or other modules may be configured (e.g., via program instructions) with additional capabilities (e.g., a kernel driver to obtain higher fidelity data for network dependencies, deep inspection of network packets from a connector, network-flow-based collectors in a connector, and gathering this data by leveraging network processing hardware offload devices).

The grouping module 472 may analyze the configuration data that was obtained from the customer's network and group the resources into useful groupings (e.g., group the servers into applications). The grouping module 472 may group applications based on observed traffic, in embodiments. For instance, machine learning, such as clustering algorithms (e.g., spectral clustering) may be used to group. Grouping functionality, when combined with presentation functionality for example, may help customer's visualize the customer network environment. The system may provide an interface such that customers can make adjustments to the groupings. Visualization of the environment may facilitate design or modification of migration plans, in embodiments.

FIG. 5 illustrates an example flow diagram of a client-side process associated with a discovery service, according to at least some embodiments. The illustrated process begins with allocation of components of the discovery service 100 and ends after discovery data has been gathered. Generally, the illustrated process may be performed by various components illustrated in FIGS. 1, 2, 3, 4, and 7, in embodiments.

As illustrated at block 516, a user may interact with the discovery service console to start the discovery service. Agents may send the discovery data to a data collection service (e.g., data collection module 450, depicted in FIG. 4). For example, the agents may post the discovery data to the connector's IP address. In some embodiments, the connector may acquire the encryption key, and/or destination credentials from the agent service, and may add the encrypted aggregated data to the destination (e.g., a data stream or a data store or service). If data upload fails, the connector may attempt to send the data again (e.g., using one or more strategies, such as an exponential back-off strategy). All or some of the actions performed on the on-Premise environment may be logged in a log file. For agents positioned on the service provider, the agent may encrypt the data and add it to a destination or data stream, in embodiments.

Using FIG. 1 as an example, the data may be captured by the agents (e.g., agents 143, 145, 147), sent to a data stream and then may be sent from the data stream to the discovery database 120. The discovery service may consume the obtained data either from the database 120 or directly from the data stream, in embodiments. For example, analyzing data obtained directly from the data stream may be one way of performing updates to the client configuration in real-time with receipt of the data from the agent. In some embodiments, a visual representation of the client configuration may be updated in the console, based at least in part on the real-time data from the data stream. In some embodiments a data stream with the data from the agents or other sources may be providing data to the discovery database 120 as well as the console or other service of the service provider at the same time.

Generally, the elements of the illustrated process may be performed by one or more of the modules or components depicted in FIGS. 1-4. For example, the discovery lifecycle manager 412 may be configured to receive a request from the client to download a discovery connector. The discovery lifecycle manager 412 may be configured to manage various different lifecycle processes of the discovery service. The discovery lifecycle manager may direct the agent service/data collection module 450 to install the connector. For example, the discovery connector may be downloaded from the discovery service 100 and installed to the client network, as at block 512. In some embodiments, the connector may be an optional feature of the system architecture.

Installation/Setup Workflow

Generally, in at least some embodiments, customers sign up for the discovery service and download a personalized connector, which may include a discovery agent framework. The console 112 may be configured to provide the customer with a view of the connector status.

A key for data encryption, and message queue for connector communication with the agent service may be created under the customer's account (e.g., the keys may be controlled by the customer, instead of controlled by the service) and sufficient privileges may be added to the agent and internal service accounts. This initial setup may be sufficient for the connector to communicate with the discovery service. In some embodiments, it may not be necessary to install a connector on instances of resources that are on the service provider network.

Installation of Discovery Agents

Discovery service agents may be downloaded from the discovery service and installed to clients on the customer network, as at block 514. In some embodiments, it may be the responsibility of the customer to install the agents on the required hosts (e.g., after choosing the required configuration, the agents may be manually installed on the hosts; customers may either attach or create the required certificates that are used to authenticate the agents). At block 514, discovery service agents are downloaded from the discovery service to the client network and installed on clients on the client network. In other embodiments, the discovery service may install the agents on the required hosts. For example the discovery service 100 may be configured to automate installation of agents on resources within the service provider network on behalf of a customer. In some embodiments the functionality described in blocks 512 and 514 (the downloading) may be performed in parallel or in the opposite order. In some embodiments, one or more of the steps of the process may iterate (e.g., the process may loop back to an earlier step). For example, the illustrated process may include a loop such that more agents are downloaded and installed after some of the prior agents have already run.

In embodiments, the system may provide customers the option to manage the installation of software agents using the connector. In other embodiments, the system can automate the deployment of agents to discover dependencies. In some instances, the system may be configured to allow customers to iteratively deploy agents as dependencies are discovered. It can also be used to deploy agents at scale to servers identified through agent-less discovery. Customers can script this feature on top of the public APIs, for example.

A user (e.g., an administrator, expert or otherwise) may interact with the discovery service console to start the discovery service (block 516). The agents run in the client network and collect discovery data pertaining to a client configuration (block 518).

The data collected by the agents may end up at the discovery database 120 in a number of different ways. For example, the agents may send data to the discovery connector(s) (block 520). The discovery connector may process the data and/or send the data on to another component (e.g., the discovery database 120). In other embodiments, the agents may send the data directly to the discovery database 120, without the data being sent to the connector.

In embodiments, the agents are configured to gather information (e.g., about the customer's various resources such as virtual machines from their virtual infrastructure management applications, their networking equipment (i.e. firewalls, routers, etc.), their storage arrays, databases, and more. In at least the illustrated embodiment, the connector(s) may aggregate the discovery data and send the discovery data to the discovery service (block 522).

A user may interact with the discovery service console to stop (or modify) the discovery service (block 524). If the discovery service is modified or continues, the process may start over again with the agents running in the customer network and collecting discovery data pertaining to a customer's client configuration, and so on, as depicted. If the user selects to stop the discovery service, the process ends (block 526).

FIG. 6 illustrates an example flow diagram of a server-side process associated with a discovery service, according to at least some embodiments. A connector and/or agents are provided to a client (block 610). For example, the discovery service may download the connector and/or agents to the client network or to resources of a service provider that operate on behalf of the customer.

A client's discovery data is received (e.g., from a connector, directly from agents, and/or from other tools) (block 612). For example, configuration data for resources operating on behalf of the customer or on the customer's data center may be gathered by a discovery connector and sent to the discovery service where the data is stored in a database, or may be sent directly to the database from the agents, in some embodiments.

Discovery data is stored in the discovery database (614). Client discovery data is queried and analyzed to determine client configurations and dependencies (block 616). For example, the discovery service 100 may analyze the client's data from the database 120 and determine configurations and dependencies of the customer's resources. In some embodiments, the data may be analyzed to determine, hierarchical structures, grouping or layers (e.g., identify server layers, logging server layers) of components.

A presentation of the client's configuration and dependencies is generated and provided to the client (block 618). For example, the discovery presentation module may generate a presentation of the client's configuration and/or dependencies and instruct display of the presentation via console 112. Modifications are received (block 620). For example, a user may review the presentation and modify the configuration and/or dependencies by interacting with interface elements of the console 112. The client configuration and/or dependencies are updated based on the modifications (block 622). For example, the modification module may update the configuration and/or dependencies and the presentation module 414 may generate a modified presentation of the client's configuration and/or dependencies and instruct display of the modified presentation via console 112

Figure 7:
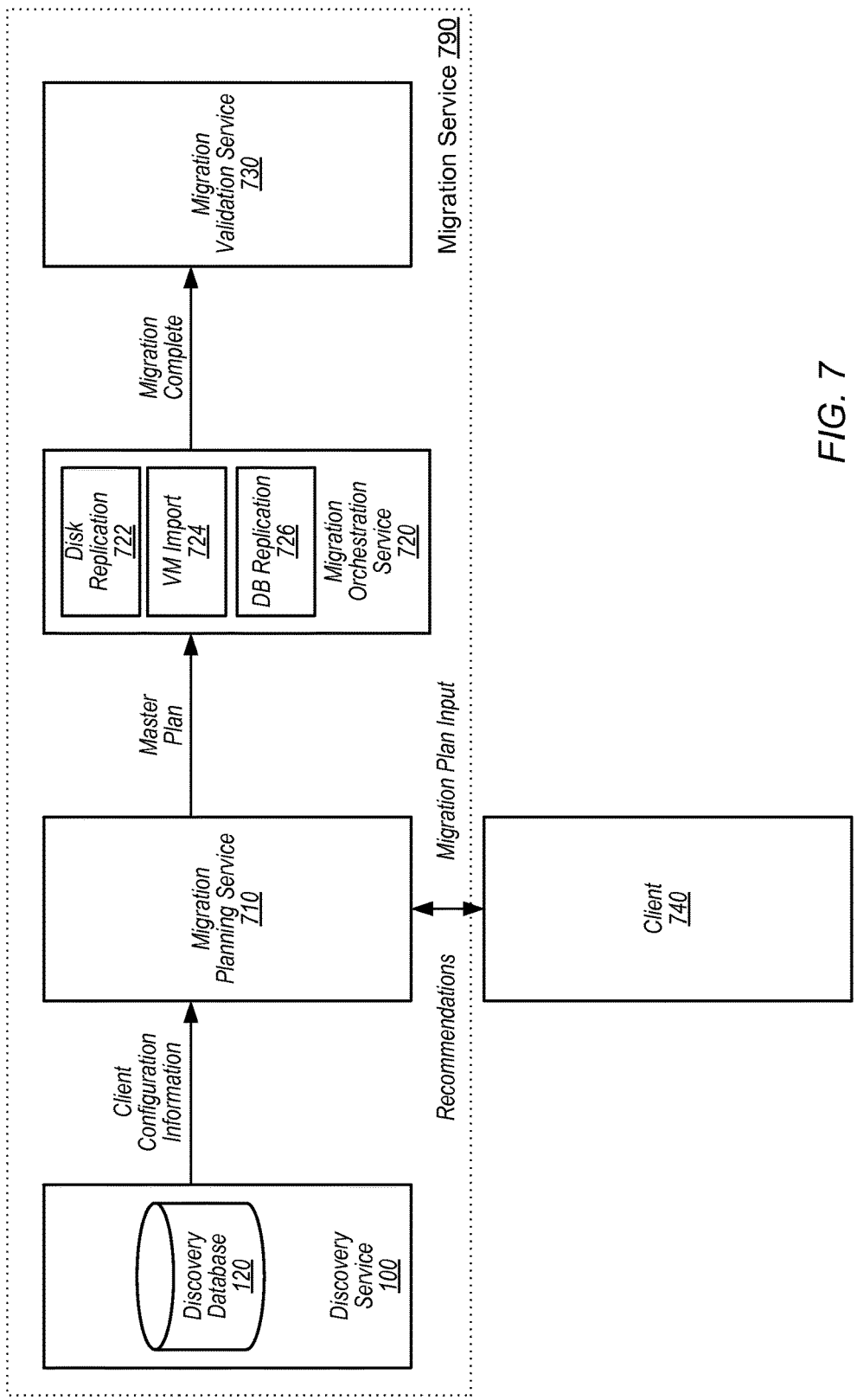
FIG. 7 is a block diagram illustrating an example block diagram of a system that uses the output from a discovery service, in at least some embodiments.

FIG. 7 is a block diagram illustrating a system that includes a migration service 790 that uses the output from a discovery service, in at least some embodiments. Although the system described herein may be used for additional purposes (e.g., monitoring, etc.) one particular use is to provide information to a migration planning service that facilitates and automates much, if not all of a migration process. Various portions of the depicted system may perform some of all of the features illustrated in FIG. 8, described below.

Example customer's for at least some of the disclosed services include enterprises migrating hundreds of servers. Various kinds of migrations (i.e., server migration, application container migration, data-only migration, and cloud-optimized rewrites) may be supported along with various data types (i.e., volume, file, object, and database). In some embodiments, system output may include migration guidance, and portions of the service may be related to management and monitoring efforts.

Customers that are interested in migrating workloads from enterprise datacenters to a service provider may sign up for the service from the connector. In embodiments, there may be a single signup step for all of the services that are part of the migration platform and other hybrid services. This step may create a unique identity and a trust certificate that can be used by the service to authenticate and authorize a customer's connector instance, in embodiments. The signup may be performed as part of setting up the connector.

In the depicted embodiment, the discovery service 100 provides client configuration information (e.g., from the discovery database 120 or otherwise) to the migration planning service 710. The migration planning service generates a migration plan recommendation, based on the received client configuration information. A customer (e.g., a user associated with or working on behalf the customer) may view the migration plan recommendation and add additional input to improve the migration plan. A selected plan (a master plan) is sent from the migration planning service 710 to a migration orchestration service 720. In embodiments, the migration orchestration service 720 may call into a set of execution services such as disk replication component 722 (either block-based or file-based replication), virtual machine import component 724, and DB replication component 726 that may carry out the migration plan. During migration or when migration is complete, a migration validation service 730 may validate the migration.

The architecture of the system may be an open design; for example third party providers may plug in and offer their own differentiated capabilities at places in the system and/or process (e.g., via APIs).

Figure 8:
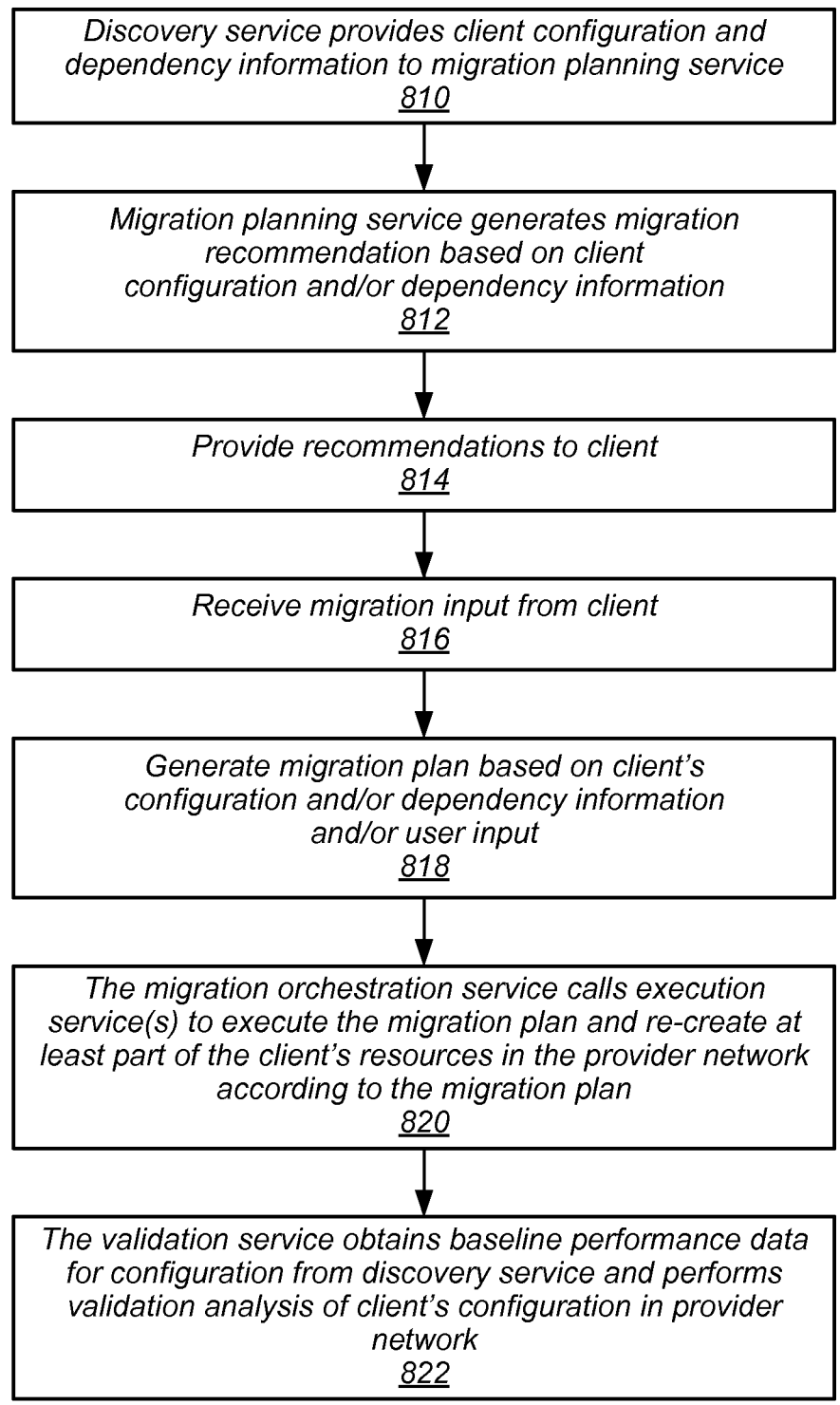
FIG. 8 is an example flow diagram of a process associated with a migration service that uses the output from a discovery service, according to at least some embodiments.

FIG. 8 is an example flow diagram of a process associated with a migration service that uses the output from a discovery service, according to at least some embodiments.

The discovery service provides client configuration and dependency information to a migration planning service (block 810). The migration planning service generates migration recommendation based on client configurations and/or dependencies (block 812). The migration planning service may propose at least one migration plan for each resource. For example, migration planning service 710 may generate a migration plan that describes an approach for how an application is migrated into the service provider network. In some cases, the migration planning service may suggest multiple migration plans for resources (e.g. applications). For example, for a simple web application the migration planning service may generate one migration plan that would perform a server-based migration importing each server into the service provider network, a second migration plan that recommends rewriting the application to be horizontally scalable and use more native services of the service provider (e.g., a relational database service) and a third migration plan that just moves the web server application code and its associated data but without the servers it runs in.

Recommendations are provided to the client (block 814). For example, the system may bring relevant information and recommendations to the customer so they can make an informed decision. When plans are set, customers can use other tools included in the Migration Platform (e.g., Server Migration Service, App Migration Service) to execute the migrations. Migration input is received from the client (block 816). A migration plan is generated based on the client' configuration and/or dependency information, and/or client's input (block 818).

The migration orchestration service 720 calls execution service(s) to execute the migration plan and re-create at least part of the client's resources in the provider network according to the migration plan (block 820). The validation service obtains baseline performance data for configuration from discovery service and performs validation analysis of client configuration in provider network (block 822).

It is noted that in various embodiments, some of the kinds of operations shown in FIGS. 5, 6 and 8 may be implemented in a different order than that shown in the figure, or may be performed in parallel rather than sequentially. For example, in some embodiments, the migration of several different applications of a given enterprise may be performed in parallel. In another alternative implementation, the load balancing instances may be migrated before the application processing instances are migrated. In at least one embodiment, some operations may not be required.

Example Use Case

For example, when a large company wants to migrate a Microsoft SharePoint application to a cloud-based service provider, they engage with a Solutions Architect. As the first step, the Solutions Architect would setup the discovery service in their datacenter. Due to the vast distributed nature of large companies, the application owner the Solutions Architect interacts with does not actually know the physical servers SharePoint runs on or any of the infrastructure level dependencies. The Solutions Architect would work with the application owners to identify the IP address or DNS name of at least one of the virtual machine workloads where SharePoint is running and, with the help of relevant operations teams, install a discovery agent within that workload. The agent will enable the customer to identify the servers that communicate with the workload and report the data to the discovery service. The Solutions Architect can then install agents on one or more of these servers to discover their dependencies in turn. The Solutions Architect will iterate through this process until he has covered all of the dependencies for SharePoint.

Once this setup process is completed, and without any other prior knowledge of the application's architecture, the Solutions Architect can observe that SharePoint is dependent on a Microsoft SQL Server and Microsoft IIS Server in their network. In addition to these application dependencies, the SharePoint application depends on infrastructure services like a DHCP server, a DNS server, a Microsoft Active Directory (AD) server, and a Log Server. Armed with this information, the Solutions Architect can create a migration plan for the large company to migrate the SharePoint application.

Illustrative Computer System

Figure 9:
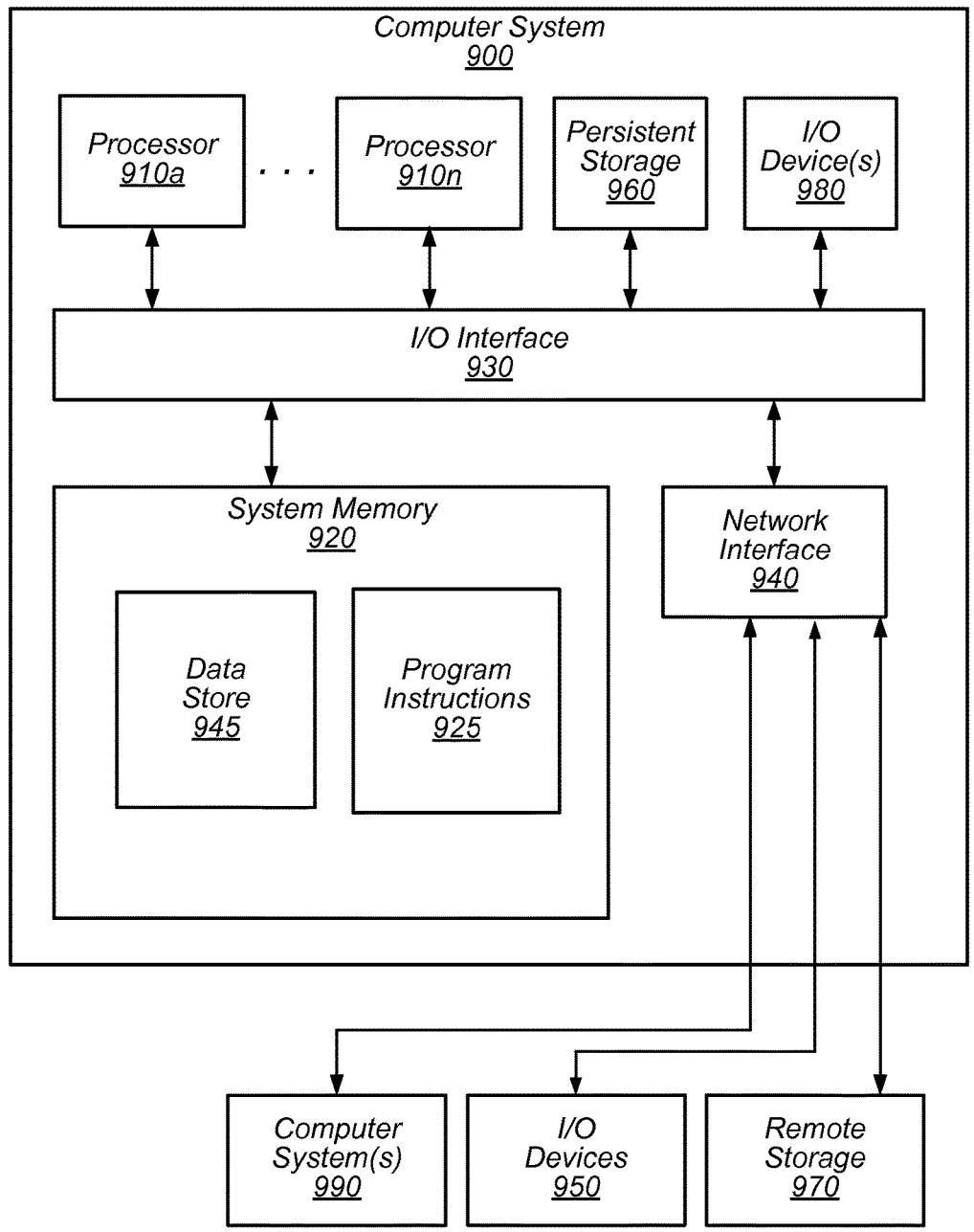
FIG. 9 is a block diagram illustrating an example computer system, according to at least some embodiments.

FIG. 9 is a block diagram illustrating an example computer system, according to at least some embodiments. In at least some embodiments, a server that implements one or more of the techniques described above for providing a discovery service, a virtual database service, or a virtual compute service may include a general-purpose computer system that includes or is configured to access one or more computer-accessible media. Resources of a client network may also be implemented by a general-purpose computer system that includes or is configured to access one or more computer-accessible media. FIG. 9 illustrates such a general-purpose computing device 900. In the illustrated embodiment, computing device 900 includes one or more processors 910 coupled to a system memory 920 (which may comprise both non-volatile and volatile memory modules) via an input/output (I/O) interface 930. Computing device 900 further includes a network interface 940 coupled to I/O interface 930.

In various embodiments, computing device 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA. In some implementations, graphics processing units (GPUs) may be used instead of, or in addition to, conventional processors.

System memory 920 may be configured to store instructions and data accessible by processor(s) 910. In at least some embodiments, the system memory 920 may comprise both volatile and non-volatile portions; in other embodiments, only volatile memory may be used. In various embodiments, the volatile portion of system memory 920 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 920 as code 925 and data 925. The functionality described above in the detailed description (e.g., with regard to FIGS. 1-8) may be implemented by program instructions that are executed by one or more of the processors, in embodiments. In some embodiments, the program instructions may be grouped into modules or components, such as those illustrated in FIG. 4, for example.

In one embodiment, I/O interface 930 may be configured to coordinate I/O traffic between processor 910, system memory 920, network interface 940 or other peripheral interfaces such as various types of persistent and/or volatile storage devices. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computing device 900 and other devices 990 attached to a network or networks (e.g., network 150), such as other computer systems or devices as illustrated in FIG. 1 through FIGS. 4 and 7, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIG. 1 through FIGS. 4 and 7 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 900 via I/O interface 930. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices configured to implement a network-based discovery service configured to provide client resource discovery services for a plurality of clients over one or more networks, and
a data store configured to store discovery information for client network-based resource configurations;
wherein the discovery service is configured to:
transmit, over the one or more networks for respective clients of the plurality of clients, one or more client-side discovery components comprising one or more connector components and a plurality of agent components, configured to execute at a respective client network-based resource configuration and collect discovery information about the respective client network-based resource configuration, wherein the one or more connector components are configured to be installed at the client network, receive discovery information from the plurality of agent components, aggregate the discovery information, and transmit the discovery information over the one or more networks to the discovery service;
receive, over the one or more networks, the collected discovery information from the respective discovery components for the respective clients;
store the received discovery information in the data store for the respective clients;
analyze the discovery information to determine respective client network-based resource configurations for the respective clients; and
generate representations of the determined respective client network-based resource configuration for the respective clients, wherein each respective client network-based resource configuration representation comprises: a description of a plurality of computer-based resources, and dependencies between at least some of the computer-based resources.

2. The system as recited in claim 1, further comprising:
a multi-tenant provider network configured to provide a plurality of network-based services, wherein the plurality of network-based services comprise one or more virtual compute or storage services configured to host at least part of one or more of the client network-based resource configurations; and
wherein the network-based discovery service is one of the services provided by the provider network and is further configured to receive discovery information from discovery components at one or more client network-based resource configurations hosted by the multi-tenant provider network in addition to one or more client network-based resource configurations implemented external to the multi-tenant provider network.

3. The system as recited in claim 2,
wherein at least one of the client network-based resource configurations is implemented at least in part by the one or more virtual compute or storage services of the multi-tenant provider network and at least in part at a client network external to the multi-tenant provider network, and
wherein the network-based discovery service is configured to aggregate discovery information from both the multi-tenant provider network and the client network to determine a client network-based resource configuration representation for the same client network-based resource configuration across the multi-tenant provider network and the client network.

4. The system as recited in claim 1,
wherein each agent of the plurality of agents is configured to be installed on a different computer system at a client network and collect discovery information pertaining to the computer system on which it is installed.

5. The system as recited in claim 4, wherein the discovery information collected by each of the plurality of agents for the respective computer system on which the agent is installed comprises identification of one or more of: software packages installed on the computer system, processes running on the computer system, type of server running on the computer system, type of operating system on the computer system, source entities for network communications received at the computer system, or destination entities for network communications sent from the computer system.

6. The system as recited in claim 4, wherein additional information collected by each of the plurality of agents for the respective computer system on which the agent is installed comprises security information, content of network communications received at the computer system, performance of the computer system, or performance of a process running on the computer system.

7. A method, comprising:
performing, by a network-based discovery service implemented by one or more computing devices comprising one or more hardware processors:

transmitting, to a client of the network-based discovery service, over one or more networks, one or more client-side discovery components comprising one or more connector components and a plurality of agent components, configured to:
  execute at a network-based resource configuration of the client at a client network, and
  collect discovery information about the network-based resource configuration of the client,
  wherein the one or more connector components are configured to be installed at the client network, receive discovery information from the plurality of agent components, aggregate the discovery information, and transmit the discovery information over the one or more networks to the discovery service;
receiving over the one or more networks, the collected discovery information from the one or more client-side discovery components;
storing the received discovery information in a data store;
analyzing the discovery information to determine the network-based resource configuration of the client; and
generating a representation of the network-based resource configuration of the client, wherein the representation comprises: a description of a plurality of computer-based resources, and dependencies between at least some of the computer-based resources.

8. The method as recited in claim 7,
wherein the representation of the network-based resource configuration of the client identifies:
  the plurality of computer-based resources,
  one or more applications, servers or processes running on the plurality of computer-based resources, and
  the dependencies between at least some of the computer-based resources, and
wherein the dependencies comprise network connectivity at least some of the computer-based resources.

9. The method as recited in claim 8,
wherein said generating the representation further comprises generating a graphical representation of the network-based resource configuration of the client, wherein the graphical representation comprises:
  a plurality of nodes representing the plurality of computer-based resources, applications or processes, and
  connections between the plurality of nodes according to the dependencies.

10. The method as recited in claim 9, further comprising:
providing the graphical representation to the client;
receiving, from the client, one or more modifications to the representation of the network-based resource configuration; and
modifying the representation of the network-based resource configuration in response to the one or more modifications.

11. The method as recited in claim 8,
wherein said analyzing comprises, based at least in part on the discovery information, mapping one or more relationships between the plurality of computer-based resources, applications, servers or processes of the network-based resource configuration of the client, wherein the one or more relationships are determined according to one or more of the network connectivity or commonality of type of computer-based resources,
wherein the one or more relationships comprise one or more of membership in a network subnet, membership in a server cluster, or membership in a load balancing group, and wherein the dependencies are determined based in least in part on the mapping of the one or more relationships.

12. The method as recited in claim 7, further comprising:
receiving discovery information for an additional network-based resource configuration of the client hosted by a multi-tenant provider network external the client network; and
aggregating the discovery information from both the provider network and the client network to determine an aggregate network-based resource configuration for the client across both the provider network and the client network.

13. A non-transitory computer-readable storage medium storing program instructions that when executed by one or more processors cause the one or more processors to implement a discovery service configured to:
  transmit to a client, over one or more networks:
    one or more client-side discovery components configured to:
      execute at a network-based resource configuration of the client at a client network, and
      collect discovery information about the network-based resource configuration of the client; and
    a connector component configured to be installed at the client network, collect the discovery information about the network-based resource configuration of the client from other client-side discovery components, and transmit the discovery information over the one or more networks to the discovery service;
  receive, over the one or more networks, the collected discovery information from the connector component;
  store the received discovery information in a data store;
  analyze the discovery information to determine the network-based resource configuration of the client; and
  generate a representation of the network-based resource configuration of the client, wherein the representation comprises: a description of a plurality of computer-based resources, and dependencies between at least some of the computer-based resources.

14. The non-transitory computer-readable storage medium as recited in claim 13, wherein, to collect the discovery information, the connector component is further configured to:
  monitor network communications between at least some of the plurality of computer-based resources at the client network; or
  invoke one or more information discovery application programming interfaces (APIs) supported by one or more network management protocols or server configurations network-based resource configuration of the client.

15. The non-transitory computer-readable storage medium as recited in claim 13, wherein the program instructions include program instructions for the one or more client-side discovery components, wherein the one or more client-side discovery components comprise a plurality of agents each configured to be installed on a respective different one of the plurality of computer-based resources at a client network and collect discovery information pertaining to the computer-based resources on which it is installed.

16. The non-transitory computer-readable storage medium as recited in claim 13, wherein the discovery service is further configured to:
  provide an application programming interface (API) to receive other discovery information from one or more tools not provided by the discovery service;
  store the other discovery information in the data store;

combine the other discovery information with the discovery information received from the one or more client-side discovery components; and generate the representation of the network-based resource configuration of the client based on the combined discovery information.

17. The non-transitory computer-readable storage medium as recited in claim 13, wherein the discovery service is further configured to provide a console interface configured to:

receive a request from the client to download the one or more client-side discovery components; and receive one or more discovery management commands from the client to start or stop a discovery process at the client network;

wherein to start or stop the discovery process, the discovery service is configured to remotely communicate over the one or more networks with the one or more client-side discovery components installed at the client network.

18. The non-transitory computer-readable storage medium as recited in claim 13, wherein the discovery service is further configured to provide a console interface configured to:

provide a graphical representation to the client of the network-based resource configuration of the client; and receive, from the client, one or more modifications to the representation of the network-based resource configuration.

19. The non-transitory computer readable medium as recited in claim 18, further storing program instructions that when executed by the one or more processors cause the one or more processors to implement a migration service comprising the discovery service;

wherein the collected discovery information stored in the data store by the discovery service comprises performance data for the network-based resource configuration running at the client network, wherein the migration service is configured to:

capture performance data for the at least a portion of the network-based resource configuration migrated to a provider network, and compare the captured performance data from the provider network to the performance data from the data store for the at least a portion of the network-based resource configuration to validate migration of the at least a portion of the network-based resource configuration.

20. The non-transitory computer readable medium as recited in claim 13, further storing program instructions that when executed by the one or more processors cause the one or more processors to implement a migration service comprising the discovery service, wherein the migration service is configured to:

generate a migration plan based at least in part on the representation of the network-based resource configuration of the client, wherein the migration plan specifies a plan to migrate at least a portion of the network-based resource configuration of the client from the client network to a multi-tenant provider network; and execute the migration plan to migrate the at least a portion of the network-based resource configuration of the client from the client network to the multi-tenant provider network.

* * * * *